US011683744B2

(12) United States Patent
Tiwari et al.

(10) Patent No.: US 11,683,744 B2
(45) Date of Patent: Jun. 20, 2023

(54) METHOD AND SYSTEM FOR HANDLING OF CLOSED ACCESS GROUP RELATED PROCEDURE

(71) Applicant: SAMSUNG ELECTRONICS CO., LTD., Suwon-si (KR)

(72) Inventors: Kundan Tiwari, Karnataka (IN); Lalith Kumar, Karnataka (IN); Narendranath Durga Tangudu, Karnataka (IN); Rajavelsamy Rajadurai, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 254 days.

(21) Appl. No.: 16/900,398

(22) Filed: Jun. 12, 2020

(65) Prior Publication Data

US 2020/0396673 A1 Dec. 17, 2020

(30) Foreign Application Priority Data

Jun. 14, 2019 (IN) .............................. 201941023638
Jun. 14, 2019 (IN) .............................. 202042022690
Apr. 17, 2020 (IN) .............................. 201941023638

(51) Int. Cl.
*H04W 48/16* (2009.01)
*H04W 60/00* (2009.01)
*H04W 12/06* (2021.01)

(52) U.S. Cl.
CPC ........... *H04W 48/16* (2013.01); *H04W 12/06* (2013.01); *H04W 60/00* (2013.01)

(58) Field of Classification Search
None
See application file for complete search history.

(56) References Cited

U.S. PATENT DOCUMENTS

2019/0045577 A1  2/2019 Kim et al.
2020/0275279 A1  8/2020 Tangudu et al.
(Continued)

FOREIGN PATENT DOCUMENTS

KR  10-2019-0060667  6/2019
WO  2019/088599  5/2019
(Continued)

OTHER PUBLICATIONS

Search Report and Written Opinion dated Sep. 9, 2020 in counterpart International Patent Application No. PCT/KR2020/007655.
(Continued)

*Primary Examiner* — Ajit Patel
*Assistant Examiner* — Pamit Kaur
(74) *Attorney, Agent, or Firm* — Nixon & Vanderhye P.C.

(57) ABSTRACT

Accordingly, Example embodiments herein disclose a method for supporting a user equipment (UE) accessing one or more closed access group (CAG) cells via a radio access network. A core network apparatus may receive via the interface circuitry a request signal that includes a protected CAG identifier (ID) associated with the UE. The core network apparatus may de-conceal the protected CAG ID to determine a CAG ID. The proposed method can be used to define how the wireless communication system will perform the subscription check for the received CAG identifier. Further, the method can also be defined how to perform resume procedure on a CAG cell when the UE (100) is in a 5GMM-CONNECTED with inactive indication or 5GMM-IDLE with suspend indication.

12 Claims, 23 Drawing Sheets

(56) References Cited

U.S. PATENT DOCUMENTS

2020/0314701 A1  10/2020  Talebi Fard et al.
2020/0314731 A1  10/2020  Ryu et al.

FOREIGN PATENT DOCUMENTS

WO   WO-2019088599 A1 *  5/2019
WO   WO-2020205609 A1 * 10/2020   ........... H04L 63/123

OTHER PUBLICATIONS

Interdigital et al.., "Discussion on possible privacy/confidentiality attacks in PLMN integrated NPN," S3-191106, 3GPP TSG-SA WG3 Meeting #95, Reno, USA, Apr. 26, 2019, 3 pages.
"Study on security for 5GS enhanced support of Vertical and LAN Services," 3GPP TR 33.819 V0.4.0, S3-191766 3GPP; TSG and SA, LAN Services, Rel. 16, May 13, 2019, 30 pages.
Office Action dated Sep. 8, 2021 in corresponding U.S. Appl. No. 16/900,157.
Office Action for EP Application No. 20822836.1 dated Jul. 4, 2022, 7 pages.
Intel Corporation, "RAN2 impact on Non-Public Network Deployment using CAG" R2-1900761, 3GPP TSG RAN WG2 Meeting #105, Athens, Greece, Feb. 25-Mar. 1, 2019, 6 pages.
3GPP TS 23.501 V16.1.0 Technical Specification, 3rd Generation Partnership Project; Technical Specification Group Services and System Aspects; System Architecture for the 5G System; Stage 2 (Release 16), Jun. 2019, 368 pages.
U.S. Appl. No. 16/900,157, filed Jun. 12, 2020, Tiwari et al.
Office Action dated Feb. 9, 2023 for U.S. Appl. No. 17/971,746, Tiwari et al., 9 pages.

* cited by examiner

METHOD AND SYSTEM FOR HANDLING OF CLOSED ACCESS GROUP RELATED PROCEDURE

CROSS-REFERENCE TO RELATED APPLICATIONS

This application is based on and claims priority under 35 U.S.C. § 119 to Indian Provisional Patent Application No. 201941023638, filed Jun. 14, 2019, in the Indian Patent Office, Indian Complete Patent Application No. 201941023638, filed on Apr. 17, 2020, in the Indian Patent Office and Indian Divisional Patent Application No. 202042022690, filed Jun. 14, 2019, in the Indian Patent Office, the disclosures of which are incorporated by reference herein in their entireties.

BACKGROUND

Field

The present disclosure relates to a wireless communication system, and, for example, is related to methods and systems for handling closed access group related procedures in the wireless communication system.

Description of the Related Art $3^{rd}$ Generation Partnership Project (3GPP) (TS 23.501) specifies Public Network integrated Non-Public Networks (PNiNPN) as Non-Public Networks (NPNs) which are deployed with the support of public land mobile networks (PLMNs) using a Closed Access Group (CAG) and/or network slicing. The CAG identifies a group of subscribers who are permitted to access one or more CAG cells. The CAG is used for Public Network integrated Non-Public Networks (PNiNPN) to prevent a user equipment (UE) from automatically selecting and registering from a location, which does not provide access to the NPN, or from a location, which the UE is not allowed to access the NPN. The CAG is identified by a CAG identifier (CAG ID), which is broadcasted by the CAG cell. A New Generation Radio Access Network (NG-RAN) supports broadcasting a total of twelve CAG Identifiers. Also, the CAG cell may in addition broadcast a human-readable network name per CAG identifier.

As the CAG cells are meant for Public Network integrated Non-Public Networks (PNiNPN), the CAG identifiers broadcasted by the network, which may also reveal the human-readable name, are related to NPNs. Therefore it is possible to establish a relation between the CAG Identifier and the NPN which it is related to.

As per 3GPP TS 33.502, in case of service request or registration management procedures, access network (AN) parameters (i.e., RRC information element(s) sent in a RRC message to the NG-RAN) from the UE to the (R)AN includes the CAG Identifier if the UE is accessing the NG-RAN using the CAG cell. When there is no valid security context (i.e., UE does not have a Globally Unique Temporary Identifier (GUTI) or the stored GUTI is not valid), the CAG ID is sent over the air to the network. Unfortunately, such a scenario allows a "man-in-the-middle" attack to associate a possible linking between the UE, Closed Access Group (CAG), and related NPN. This leads to:

1. Possible exposure of privacy of the NPN services the UE is accessing. NPNs are meant to be private networks and may be privacy sensitive.
2. It is possible for a man-in-the-middle attacker to identity a group of UE's accessing a CAG cell (and its CAG ID), thereby associating a group of UEs to the NPNs they are accessing.

Standalone Non-Public Networks do not rely on network functions of public PLMNs. It is also possible that standalone Non-Public Networks use a Closed Access Group (CAG) and/or the non-public network identifier (NPN ID) to identify a group of NPN subscribers who are permitted to access one or more CAG cell or NPN.

In another problem scenario, the 3GPP TS 23.501 specifies Public Network integrated Non-Public Networks (PNiNPN) as Non-Public Networks (NPNs) which are deployed with the support of public PLMNs using the CAG and/or network slicing. The CAG identifies a group of subscribers who are permitted to access one or more CAG cells. The CAG is used for Public Network integrated Non-Public Networks (PNiNPN) to prevent the UE from automatically selecting and registering from a location, which does not provide access to the NPN, or from a location, which the UE is not allowed to access the NPN.

The UE is configured by the home network with an Allowed CAG List, which includes a list of CAG IDs that the UE is allowed to access. The UE uses this list for selecting a CAG ID/CAG Cell to access PNiNPN. As per 3GPP TS 23.501, if the CAG identifier received from the NG-RAN, that the UE is attempting to access, is not in Allowed CAG List for the UE, then the serving network's Access and Mobility Management Function (AMF) rejects the Non-access Stratum (NAS) request with an appropriate cause code, and upon receipt of the NAS rejection, the UE removes the CAG Identifier, if it exists, from the UE's Allowed CAG List, as defined in TS 24.501.

If the AMF issues an unprotected NAS rejection to the UE, for the UE's NAS request, then the UE, upon receipt of such a NAS rejection with an appropriate cause code related to the CAG ID, will update its Allowed CAG List by removing the CAG ID from the list, but without being able to verify the authenticity of the NAS rejection message from the AMF. Therefore, the UE will not attempt to access the CAG ID because it was removed from Allowed CAG List.

Given the above scenario, it is possible for the attacker to send an unprotected NAS rejection message to the UE with an appropriate cause code related to the CAG ID. When the UE receives the NAS reject message, the UE removes the CAG ID from its Allowed CAG List, and therefore, the UE does not make any further attempt to access the CAG ID. This attack enables an attacker to prevent the UE from accessing the CAG cell (CAG ID), thereby leading to Denial-of-Service attack on UEs that access NPN service via the CAG cells.

In another problem scenario, after a power cycle, the UE deletes a PLMN specific attempt counter. After power ON, if the UE manually selects a PLMN which is part of a Forbidden PLMN (FPLMN) list, the UE will attempt to register with that PLMN. The UE receives a non-integrity protected rejection message from the network. As the PLMN specific attempt counter is reset, following non-integrity protected rejection message handling, as described in TS 24.501, the UE will re-attempt to register for "x" number of times, where "x" is the MAX value of the PLMN specific attempt counter. These registration reattempts by the UE create an unnecessary signalling load on the network.

In another problem scenario, the UE attempts to register on a PLMN (P1). The UE receives a non-integrity protected rejection with cause #11. The UE increases the PLMN specific attempt counter. If the UE attempts for example 4 times, the PLMN specific attempt counter is set to 4. Assume in this example that the MAX value per the UE implementation is 5. The UE performs a power cycle, and the UE deletes the PLMN specific attempt counter. After power ON, the UE again attempts registration on the PLMN P1. The UE receives a non-integrity protected rejection message from the network. As the PLMN specific attempt counter is reset in step 4 in TS 24.501, following the non-integrity protected rejection message handling described in TS 24.501, the UE will re-attempt to register "5" more times, when "5" is the MAX value of the PLMN specific attempt counter. These reattempts by the UE create an unnecessary signalling load on the network.

In another problem scenario, according to the initial NAS message protection procedure described in current 3GPP specifications 25.401 and 33.501, if a UE does not have a valid NAS security context, then the UE will send only cleartext IE(s) in the Initial NAS message, and after the NAS security context is established, the UE sends the cleartext IE(s) and the non-cleartext IE(s) in a Security Mode Complete message. If the UE has a valid 5G NAS security context, then the UE sends cleartext IE(s) and non-cleartext IE(s) in the Initial NAS message, and the cleartext IE(s) and non-cleartext IE(s) are encrypted using a current 5G NAS security context. New Information Elements (IE) Low Access priority Indication, Strictly Periodic Registration Timer Indication, extended DRX (cycle) and Closed Access Group (CAG) Identity are sent in the Initial NAS message (e.g. Registration Request message). However, it is not clear how these parameters are to be sent to the network when the UE has no valid 5G NAS security context, e.g., whether these parameters should be sent without encryption or with encryption.

In another problem scenario, according to current 3GPP TS 23.501, during RRC connection establishment, the UE sends the selected CAG ID to the NG-RAN during the RRC Connection establishment, and the NG-RAN forwards the CAG ID to the AMF. The AMF checks whether the UE has a valid subscription or not for the CAG ID. However, during the transition from 5GMM-CONNECTED with RRC inactive to 5GMM-CONNECTED mode, it is not clear how the AMF will know whether the UE is allowed to access the CAG cell or not.

In another problem scenario, according to current 3GPP TS 23.501, during the RRC connection establishment the UE sends the selected CAG ID to the NG-RAN during the RRC Connection establishment, and the NG-RAN forwards the CAG ID to the AMF. The AMF checks whether the UE has a valid subscription for the CAG ID. However, during the transition from the 5GMM-IDLE with suspend Indication to 5GMM-CONNECTED mode, it is not clear how the AMF will know whether the UE is allowed to access the CAG cell or not.

In another problem scenario, the UE camps on a CAG cell which broadcasts multiple CAG identities of a same public network integrated NPN. The UE has an Allowed CAG list which contains more than one-broadcasted CAG cell identity. If the UE initiates an RRC connection, then the UE selects one of the CAG broadcasted CAG identifiers present in the Allowed CAG list and sends it during the RRC connection procedure. The NG-RAN then sends this CAG identifier to the AMF. The AMF checks whether the UE has a subscription related to the received CAG identifier. If the UE has a subscription related to the CAG identifier, then the network proceeds with the NAS procedure. Otherwise, the network indicates to the UE that CAG subscription corresponding the CAG identifier has expired. The network subsequently releases the N1 signaling connection, and the NAS procedure is aborted. However, the UE may have a valid subscription for another CAG identifier broadcasted in the CAG cell. Therefore, in this case the UE behavior is not correct.

In another problem scenario, in a disaster situation when a large number of UEs generate signalling requests related to a CAG Identity, the AMF cannot process all the requests. The AMF may get congested and may not work properly. In a worst case, the AMF may stop working. Currently, the AMF has no procedure to restrict the incoming traffic related to the CAG identity.

Thus, it is desired to address the above-mentioned disadvantages or other shortcomings or at least provide a useful alternative.

SUMMARY

Example embodiments of the disclosure provide methods and systems for handling of closed access group related procedures.

Accordingly, Example embodiments herein disclose a core network apparatus for supporting a user equipment (UE) accessing one or more closed access group (CAG) cells via a radio access network. The core network apparatus includes interface circuitry to interface with the radio access network and processing circuitry. The processing circuitry may be configured to receive via the interface circuitry a request signal that includes a protected CAG identifier (ID) associated with the UE, wherein the protected CAG ID is useable to request access for the UE to the CAG cell. The processing circuitry may be configured to de-conceal the protected CAG ID to determine a CAG ID, wherein the protected CAG ID includes the CAG ID.

In an example embodiment, the processing circuitry is further configured to provide the CAG ID for authentication.

In an example embodiment, the processing circuitry is further configured, when the CAG ID is authenticated, to proceed with registration of the UE.

In an example embodiment, the processing circuitry is further configured to detect whether the request signal includes an indicator that protected CAG ID is included in the request signal.

In an example embodiment, the CAG ID is the CAG ID embedded in a subscription concealed identifier (SUCI) of the UE.

In an example embodiment, the protected CAG ID is the CAG ID concatenated with a mobile subscription identification number (MSIN) associated with the UE.

In an example embodiment, the protected CAG ID is the CAG ID concatenated with a part of a subscription permanent identifier (SUPI) associated with the UE.

Example embodiments herein disclose a user equipment (UE) for accessing one or more closed access group (CAG) cells. The UE includes radio communications circuitry and processing circuitry. The processing circuitry may be configured to produce a protected CAG identifier (ID) useable to request access for the UE to the CAG cell. The processing circuitry may be configured to provide the radio communications circuitry with the protected CAG ID. The radio communications circuitry may be configured to transmit to a radio access network a request signal directed to a core network, wherein the request signal may include the protected CAG ID, and wherein the CAG ID may include a CAG ID.

In an example embodiment, the request signal is a registration request and the protected CAG ID protects the CAG ID of the UE from linking of attacker for accessing to a public network integrated non-public network (PNiNPN) via the CAG cell.

In an example embodiment, the processing circuitry is further configured to produce the protected CAG ID by embedding the CAG ID in a subscription concealed identifier (SUCI) of the UE.

In an example embodiment, the protected CAG ID is the CAG ID concatenated with a mobile subscription identification number (MSIN) associated with the UE.

In an example embodiment, the protected CAG ID is the CAG ID concatenated with a part of a subscription permanent identifier (SUPI) associated with the UE.

In an example embodiment, the processing circuitry is further configured to provide to the radio communications circuitry an indicator that the protected CAG ID is included in the request signal, wherein the radio communications circuitry is configured to transmit the indicator to core network via the radio access network.

Example embodiments herein disclose a non-transitory, computer-readable storage medium having computer-readable instructions stored thereon for accessing one or more closed access group (CAG) cells, the computer-readable instructions are configured to, when executed, instruct one or more processing circuitries to produce a protected CAG identifier (ID) useable to request access for the UE to the CAG cell. The one or more processing circuitries may provide the protected CAG ID to radio communications circuitry and cause to be transmitted to a radio access network a request signal directed to a core network. The request signal may include the protected CAG ID, wherein the protected CAG ID may include a CAG ID.

Example embodiments herein disclose a user equipment (UE) for accessing one or more closed access group (CAG) cells. The UE may include radio communications circuitry and processing circuitry. The processing circuitry is coupled to the radio communications circuitry and configured to obtain an initial non access staratum (NAS) message including a CAG identifier (ID) for a CAG cell to access, the CAG ID being protected by a scheme. The processing circuitry may be configured to provide the radio communications circuitry with the initial NAS message, and the radio communications circuitry may be configured to transmit to a radio access network the initial NAS message.

In an example embodiment, the initial NAS message is a registration request message for accessing to a public network integrated non-public network (PNiNPN) via the CAG cell.

In an example embodiment, the processing circuitry is further configured to obtain the protected CAG ID by concatenating the CAG ID with a mobile subscription identification number (MSIN) of the UE.

In an example embodiment, the processing circuitry is further configured to obtain the protected CAG ID by concatenating a subscription identifier of the UE with the CAG ID.

In an example embodiment, the subscription identifier is a part of an international mobile subscriber identity (IMSI) of the UE.

In an example embodiment, the subscription identifier is a part of a subscription permanent identifier (SUPI) of the UE.

In an example embodiment, the protected CAG ID is obtained by concealing the CAG ID in a subscription concealed identifier (SUCI) of the UE.

Example embodiments herein disclose a method implemented by a user equipment (UE) for accessing one or more closed access group (CAG) cells. The UE may produce by processing circuitry a protected CAG identifier (ID) useable to request access for the UE to the CAG cell and provide the protected CAG ID to radio communications circuitry. The UE may transmit by the radio communications circuitry to a radio access network a request signal directed to a core network. The request signal may include the protected CAG ID, wherein the protected CAG ID may include a CAG ID.

Example embodiments herein disclose a method implemented by a core network apparatus for supporting a user equipment (UE) accessing one or more closed access group (CAG) cells via a radio access network. The core network apparatus may receive a request signal that includes a protected CAG identifier (ID) associated with the UE. The protected CAG ID may be useable to request access for the UE to the CAG cell. The core network apparatus may de-conceal the protected CAG ID to determine a CAG ID, wherein the protected CAG ID may include the CAG ID.

Example embodiments herein disclose a method by the UE for handling a CAG related procedure in a wireless communication system. The UE may trigger an initial registration procedure with at least one of an AMF entity and a SEAF entity. The UE may detect that the UE does not have a valid non access stratum (NAS) security context. The UE may protect a CAG identifier (CAG ID) based on the detection during the initial registration procedure.

Example embodiments herein disclose a method for handling a closed access group (CAG) related procedure in a wireless communication system. A network may receive a radio resource control (RRC) resume request message from a user equipment (UE). The network may determine whether at least one CAG identifier (ID) broadcasted in a CAG cell is included in an allowed CAG list of the UE in response to the RRC resume request message. The network may proceed with a RRC resume procedure in response to determining that the at least one CAG ID is included in the allowed CAG list.

In an example embodiment, the network further release a RRC connection by sending a RRC message if the at least one CAG ID is not included in the allowed CAG list.

In an example embodiment, the RRC message is at least one of a RRC connection release message and a RRC connection reject message.

In an example embodiment, the RRC message comprises an information element indicating that the at least one CAG ID is not subscribed based on the released RRC connection.

In an example embodiment, the RRC message comprises the allowed CAG list based on the released RRC connection.

In an example embodiment, the at least one CAG ID is determined based on mobility restrictions received from an Access and Mobility Management function (AMF) entity, wherein the network receives the allowed CAG list from the AMF entity.

In an example embodiment, the mobility restrictions correspond to a mobility related subscription information of the UE, wherein the mobility related subscription information comprises at least one of a Radio Access Technology (RAT) restriction, a forbidden area, a service area restriction, a core network type restriction, and closed access group information.

In an example embodiment, the network receives the RRC resume request message, when the UE initiates the RRC resume procedure from a RRC inactive state to a RRC connected state transition in the CAG cell.

Example embodiments herein disclose a network for handling a closed access group (CAG) related procedure in a wireless communication system. The network comprises a radio communications circuitry and a processing circuitry. The processing circuitry coupled with the radio communications circuitry and configured to receive a radio resource control (RRC) resume request message from a user equipment (UE). The processing circuitry is configured to determine whether at least one CAG identifier (ID) broadcasted in a CAG cell is included in an allowed CAG list of the UE in response to the RRC resume request message. The processing circuitry is configured to proceed with a RRC resume procedure in response to determining that the at least one CAG ID is included in the allowed CAG list.

In an example embodiment, the processing circuitry is configured to release a RRC connection by sending a RRC message when the at least one CAG ID is not included in the allowed CAG list.

In an example embodiment, the RRC message is at least one of a RRC connection release message and a RRC connection reject message.

In an example embodiment, the RRC message comprises an information element indicating that the at least one CAG ID is not subscribed based on the released RRC connection.

In an example embodiment, the RRC message comprises the allowed CAG list based on the released RRC connection.

In an example embodiment, the processing circuitry is configured to determine the at least one CAG identifier based on mobility restrictions received from an Access and Mobility Management function (AMF) entity, wherein the processing circuitry is configured to receive the allowed CAG list from the AMF entity and the processing circuitry is configured to receive the RRC resume request message when the UE initiates the RRC resume procedure from a RRC inactive state to a RRC connected state transition in the CAG cell.

In an example embodiment, the mobility restrictions correspond to a mobility related subscription information of the UE, wherein the mobility related subscription information comprises at least one of a Radio Access Technology (RAT) restriction, a forbidden area, a service area restriction, a core network type restriction, and closed access group information.

Example embodiments herein disclose a method for handling a closed access group (CAG) related procedure in a wireless communication system. A user equipment (UE) may transmit a radio resource control (RRC) resume request message to a network. The UE may receive a RRC resume message from the network in response to a determination that at least one CAG identifier (ID) broadcasted in a CAG cell is in an allowed CAG list of the UE.

In an example embodiment, the UE may receive a radio resource control (RRC) message comprising an information element from the network indicating that the at least one CAG ID is not subscribed when the at least one CAG ID broadcasted by the CAG cell is not included in the allowed CAG list. The UE may receive the RRC message comprising the allowed CAG list from the network. The UE may perform one of: removing the at least one CAG ID from the allowed CAG list based on the received information element and replacing a stored CAG list with the received allowed CAG list based on the received information element.

In an example embodiment, the RRC message is at least one of a RRC connection release message and a RRC connection reject message.

Example embodiments herein disclose a user equipment (UE) for handling a closed access group (CAG) related procedure in a wireless communication system. The UE comprises an interface circuitry and a processing circuitry coupled with the interface circuitry. The processing circuitry may be configured to transmit a radio resource control (RRC) resume request message to a network. The processing circuitry may be configured to receive RRC resume message from the network in response to a determination that at least one CAG identifier (ID) broadcasted in a CAG cell is in an allowed CAG list of the UE.

In an example embodiment, the processing circuitry may be further configured to receive a radio resource control (RRC) message comprising an information element from a network indicating that the at least one CAG ID is not subscribed when the at least one CAG ID broadcasted by the CAG cell is not included in the allowed CAG list, receive the RRC message comprising the allowed CAG list from the network, and perform one of: remove the at least one CAG ID from the allowed CAG list based on the received information element and replace the a stored CAG list with the received allowed CAG list based on the received information element. The RRC message may be at least one of a RRC connection release message and a RRC connection reject message.

In an example embodiment, the CAG ID is protected in a subscription concealed identifier (SUCI).

In an example embodiment, the method further comprises sending, by the UE, a registration request message comprising a SUCI having the protected CAG ID to at least one of an AMF entity and a SEAF entity.

In an example embodiment, the CAG ID is protected in the SUCI by protecting the CAG ID with a subscription permanent identifier (SUPI) into the SUCI.

In an example embodiment, the UE sends the registration request message comprising the protected CAG ID as AN parameters to at least one of the AMF entity and the SEAF entity.

In an example embodiment, indicating, by the UE, whether the protected CAG ID is present in a SUCI to at least one of an AMF entity and a SEAF entity.

In an example embodiment, the CAG ID is protected during an initial non-access stratum (NAS) registration procedure, when the UE is accessing a new radio random access network (NG-RAN) using a CAG cell.

In an example embodiment, during a determination of the SUCI, the UE is configured to concatenate the CAG ID with at least one of a mobile subscription identification number (MSIN) and a username of the UE and generate a scheme output of the SUCI for protecting the CAG ID in the SUCI.

In an example embodiment, the scheme output is determined based on an elliptic curve cryptography (ECC) ephemeral public key, a cipher text value, and a medium access control (MAC) tag value.

In an example embodiment, when the SUPI is a type of an international mobile subscriber identity (IMSI), a subscription identifier part of the IMSI is concatenated with the CAG ID to construct a scheme-input and generate a scheme output of the SUCI for protecting the CAG ID in the SUCI.

In an example embodiment, the scheme-input is determined by the protected CAG ID, a public key of a home network and an elliptic curve cryptography (ECC) ephemeral public and private key pair according to an elliptic curve integrated encryption scheme (ECIES) parameters provisioned by the home network.

In an example embodiment, when the SUPI is a type of a network specific identifier, a subscription identifier part of the SUPI is concatenated with the CAG ID and used to construct a scheme-input and generate a scheme output of the SUCI for protecting the CAG ID in the SUCI.

Example embodiments herein disclose a method for handling a CAG related procedure in a wireless communication system. One of an AMF entity and a SEAF entity may receive a registration request message comprising a SUCI having a protected CAG ID from a UE. The one of an AMF entity and a SEAF entity may send an authenticate request message to an AUSF entity based on the registration request message. The authenticate request message comprises the SUCI having the protected CAG ID. The one of an AMF entity and a SEAF entity may initiate a primary authentication procedure based on the authenticate request message.

In an example embodiment, one of the AMF entity and the SEAF entity receives the registration request message comprising the SUCI having the protected CAG ID in one of N2 parameters and a message, from the UE, over a new generation radio access network (NG-RAN), wherein the N2 parameters are information elements sent in a next generation application protocol (NGAP) message on a N2 interface.

The message can be a Nudm_UEAuthentication_Get_Request message.

Example embodiments herein disclose a method for handling a CAG related procedure in a wireless communication system. An AUSF entity may receive an authenticate request message from one of an AMF entity and a SEAF entity. The authenticate request message includes the SUCI having the protected CAG ID. The AUSF entity may send an authentication get request message to an UDM, wherein the UDM determines that the authenticate request message comprises the SUCI having the protected CAG ID. The AUSF entity may receive an authentication get response message from the UDM by de-concealing the SUCI to a SUPI and a CAG ID by the UDM, wherein the authentication get response message comprises a de-concealed CAG ID with SUPI. The AUSF entity may share the authentication get response message from the UDM to at least one of the AMF and the SEAF.

Example embodiments herein disclose a UE for handling a CAG related procedure in a wireless communication system. The UE includes a processor coupled with a memory. The processor is configured to trigger an initial registration procedure with at least one of an AMF entity and a SEAF entity and detect that the UE does not have a valid NAS security context, while triggering the initial registration procedure. The processor protects a CAG ID based on the detection during the initial registration procedure Example embodiments herein disclose an AMF entity and an SEAF entity for handling a CAG related procedure in a wireless communication system. One of the AMF entity and the SEAF entity includes a processor coupled with a memory. The processor is configured to receive a registration request message comprising a SUCI having a protected CAG ID from a UE. Further, the processor is configured to send an authenticate request message to an AUSF entity based on the registration request message. The authenticate request message includes the SUCI having the protected CAG ID. Further, the processor is configured to initiate a primary authentication procedure based on the authenticate request message.

Example embodiments herein disclose an AUSF entity for handling a CAG related procedure in a wireless communication system. The AUSF entity includes a processor coupled with a memory. The processor is configured to receive an authenticate request message from one of an AMF entity and a SEAF entity. The authenticate request message comprises the SUCI having the protected CAG ID. Further, the processor is configured to send an authentication get request message to an UDM, where, the UDM determines that the authenticate request message comprises the SUCI having the protected CAG ID. Further, the processor is configured to receive an authentication get response message from the UDM, by de-concealing the SUCI to a SUPI and a CAG ID using the UDM. The authentication get response message comprises de-concealed CAG ID with SUPI. Further, the processor is configured to share the authentication get response message from the UDM to at least one of the AMF and the SEAF.

Example embodiments herein disclose a method for handling a CAG related procedure in a wireless communication system. The UE may trigger an initial registration procedure with at least one of an AMF entity and a SEAF entity. The UE may detect that the UE does not have a valid non access stratum (NAS) security context, while triggering the initial registration procedure. The UE may send an initial NAS message with a clear text information element (IE), wherein the UE does not include a first information element in the initial NAS message. The UE may create a NAS security context. The UE may transmit a security mode complete NAS message including a complete initial NAS message, wherein the security mode complete NAS message is ciphered with the NAS security context.

In an example embodiment, the security mode complete NAS message comprises the first IE.

In an example embodiment, the first IE is a CAG identifier.

In an example embodiment, creating, by the UE, the NAS security context comprises performing an authentication procedure between the UE and an AMF, receiving a security mode command based on the authentication procedure, and creating the NAS security context based on the received security mode command.

Example embodiments herein disclose an UE for handling a CAG related procedure in a wireless communication system. The UE includes a processor coupled with a memory. The processor triggers an initial registration procedure with at least one of an AMF entity and a SEAF entity, while triggering the initial registration procedure. The processor detects that the UE does not have a valid NAS security context. Further, the processor sends an initial NAS message with a clear text information element (IE), where the UE does not include a first information element in the initial NAS message. Further, the processor creates a NAS security context and transmits a security mode complete NAS message including a complete initial NAS message, wherein the security mode complete NAS message is ciphered with the NAS security context.

These and other aspects of the example embodiments herein will be better appreciated and understood when considered in conjunction with the following description and the accompanying drawings. It should be understood, however, that the following descriptions, while indicating preferred example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF THE DRAWINGS

The above and other aspects, features and advantages of certain example embodiments of the present disclosure will be more apparent from the following detailed description, taken in conjunction with the accompanying drawings, in which.

DETAILED DESCRIPTION

Figure 1:
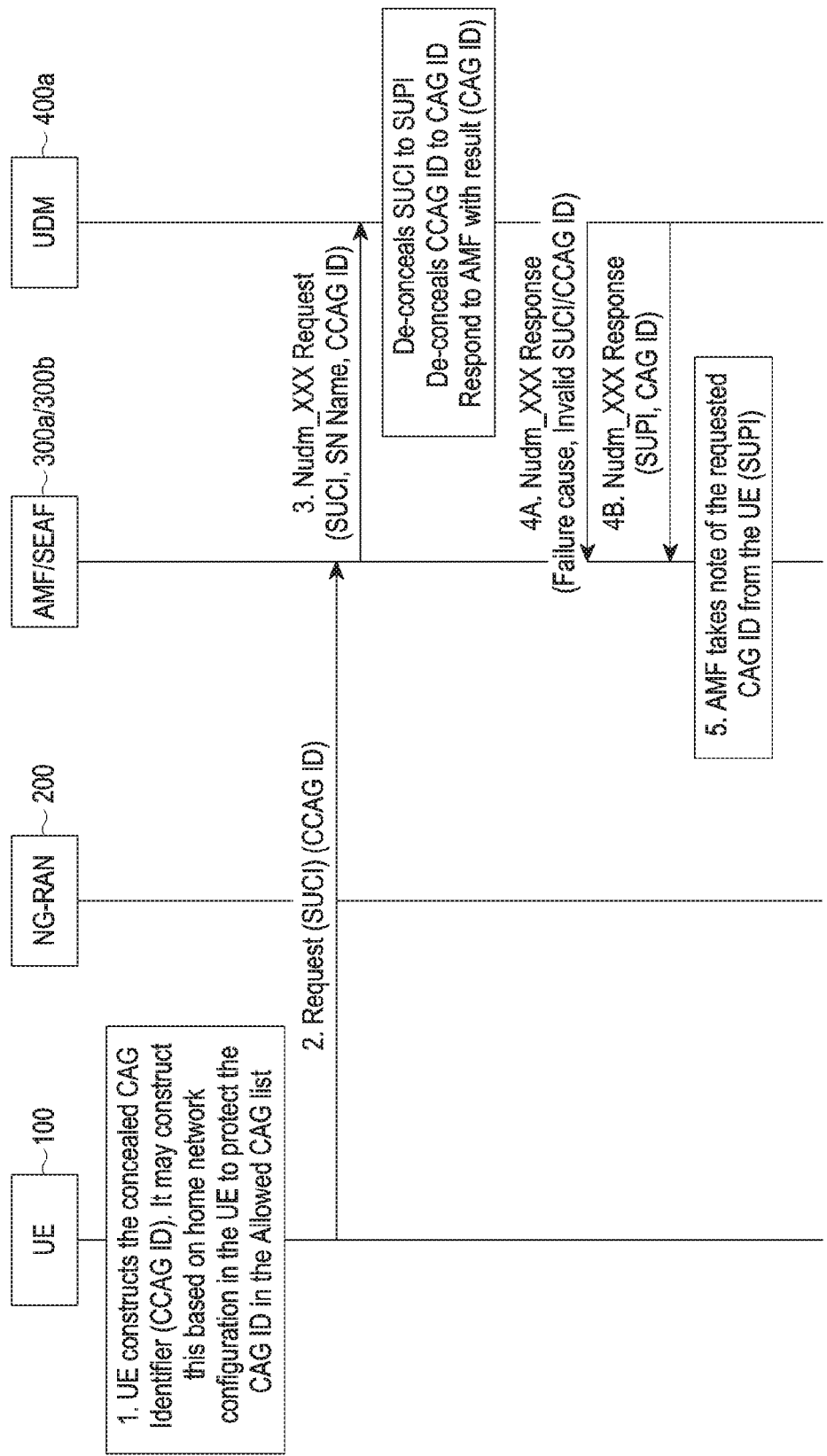
FIG. 1 is a sequence flow diagram illustrating a method for sending CAG identifier with encryption when UE sends privacy protected CAG ID to the Network, according to an example embodiment as disclosed herein.

The example embodiments herein and the various features and advantageous details thereof are explained more fully with reference to the non-limiting example embodiments that are illustrated in the accompanying drawings and detailed in the following description. Descriptions of well-known components and processing techniques are omitted so as to not unnecessarily obscure the example embodiments herein. Also, the various example embodiments described herein are not necessarily mutually exclusive, as some example embodiments can be combined with one or more other example embodiments to form new example embodiments. The term "or" as used herein, refers to a non-exclusive or, unless otherwise indicated. The examples used herein are intended merely to facilitate an understanding of ways in which the example embodiments herein can be practiced and to further enable those skilled in the art to practice the example embodiments herein. Accordingly, the examples should not be construed as limiting the scope of the example embodiments herein.

As is traditional in the field, example embodiments may be described and illustrated in terms of blocks which carry out a described function or functions. These blocks, which may be referred to herein as circuitries or units or modules or the like, are physically implemented by analog or digital circuits such as logic gates, radio communications circuitry, interface circuitry, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor or a processing circuitry (e.g., one or more programmed microprocessors and associated circuitry), or by a combination of dedicated hardware to perform some functions of the block and a processor to perform other functions of the block. Each block of the example embodiments may be physically separated into two or more interacting and discrete blocks without departing from the scope of the invention. Likewise, the blocks of the example embodiments may be physically combined into more complex blocks without departing from the scope of the invention The accompanying drawings are used to help easily understand various technical features and it should be understood that the example embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

The following definitions and abbreviations apply in the patent disclosure:

5GC 5G Core Network
5GLAN 5G Local Area Network
5GS 5G System
5G-AN 5G Access Network
5G-EIR 5G-Equipment Identity Register
5G-GUTI 5G Globally Unique Temporary Identifier
5G-BRG 5G Broadband Residential Gateway
5G-CRG 5G Cable Residential Gateway
5G-RG5G Residential Gateway
5G-S-TMSI 5G S-Temporary Mobile Subscription Identifier
5QI 5G QoS Identifier
AF Application Function
AMF Access and Mobility Management Function
AS Access Stratum
ATSSS Access Traffic Steering, Switching, Splitting
ATSSS-LL ATSSS Low-Layer
AUSF Authentication Server Function
BSF Binding Support Function
CAG Closed Access Group
CAPIF Common API Framework for 3GPP northbound APIs
CHF Charging Function
CP Control Plane
DL Downlink
DN Data Network
DNAI DN Access Identifier
DNN Data Network Name
DRX Discontinuous Reception
ePDG evolved Packet Data Gateway
EBI EPS Bearer Identity
FAR Forwarding Action Rule
FN-BRG Fixed Network Broadband RG
FN-CRG Fixed Network Cable RG
FN-RG Fixed Network RG
FQDN Fully Qualified Domain Name
GFBR Guaranteed Flow Bit Rate
GMLC Gateway Mobile Location Centre
GPSI Generic Public Subscription Identifier
GUAMI Globally Unique AMF Identifier
HR Home Routed (roaming)
I-SMF Intermediate SMF
LADN Local Area Data Network
LBO Local Break Out (roaming)
LMF Location Management Function
LRF Location Retrieval Function
MCX Mission Critical Service
MDBV Maximum Data Burst Volume
MFBR Maximum Flow Bit Rate
MICO Mobile Initiated Connection Only
MPS Multimedia Priority Service
MPTCP Multi-Path TCP Protocol
N3IWF Non-3GPP InterWorking Function
NAI Network Access Identifier
NEF Network Exposure Function
NF Network Function
NGAP Next Generation Application Protocol
NID Network identifier
NPN Non-Public Network
NR New Radio
NRF Network Repository Function
NSI ID Network Slice Instance Identifier
NSSAI Network Slice Selection Assistance Information
NSSF Network Slice Selection Function
NSSP Network Slice Selection Policy
NWDAF Network Data Analytics Function
PCF Policy Control Function
PDR Packet Detection Rule
PDU Protocol Data Unit
PEI Permanent Equipment Identifier
PER Packet Error Rate
PFD Packet Flow Description
PPD Paging Policy Differentiation
PPF Paging Proceed Flag
PPI Paging Policy Indicator
PSA PDU Session Anchor
QFI QoS Flow Identifier
QoE Quality of Experience
(R)AN (Radio) Access Network
RG Residential Gateway
RQA Reflective QoS Attribute
RQI Reflective QoS Indication
RSN Redundancy Sequence Number
SA NR Standalone New Radio
SBA Service Based Architecture
SBI Service Based Interface
SCP Service Communication Proxy
SD Slice Differentiator
SEAF Security Anchor Functionality
SEPP Security Edge Protection Proxy
SMF Session Management Function
SMSF Short Message Service Function
SN Sequence Number SNPN Stand-alone Non-Public Network
S-NSSAI Single Network Slice Selection Assistance Information
SSC Session and Service Continuity
SSCMSP Session and Service Continuity Mode Selection Policy
SST Slice/Service Type
SUCI Subscription Concealed Identifier
SUPI Subscription Permanent Identifier
TNAN Trusted Non-3GPP Access Network
TNAP Trusted Non-3GPP Access Point
TNGF Trusted Non-3GPP Gateway Function
TNL Transport Network Layer
TNLA Transport Network Layer Association
TSC Time Sensitive Communication
TSN Time Sensitive Networking
TSP Traffic Steering Policy
UDM Unified Data Management
UDR Unified Data Repository
UDSF Unstructured Data Storage Function
UL Uplink
UL CL Uplink Classifier
UPF User Plane Function
URLLC Ultra Reliable Low Latency Communication
URRP-AMF UE Reachability Request Parameter for AMF
URSP UE Route Selection Policy
VID VLAN Identifier
VLAN Virtual Local Area Network
W-5GAN Wireline 5G Access Network
W-5GBAN Wireline BBF Access Network
W-5GCAN Wireline 5G Cable Access Network
W-AGF Wireline Access Gateway Function
5GMM 5G Mobility Management
CAG ID CAG Identifier
NGAP NG Application Protocol
AS Access Stratum
NAS Non Access Stratum CAG identity and CAG identifier are equivalent terms in all example embodiments.

A core network apparatus may include one of 5G network entities (AMF, SEAF, UDM, ARPF, SIDF or AUSF). The core network may connect with the UE (100) via the NG-RAN.

Accordingly, example embodiments herein disclose a method for handling a CAG related procedure in a wireless communication system. The UE may trigger an initial registration procedure with at least one of an AMF entity and a SEAF entity. The UE may detect that the UE does not have a valid NAS security context while triggering the initial registration procedure and protect a CAG ID based on the detection during the initial registration procedure.

Unlike conventional methods and systems, the method can be used to define a procedure to transmit a CAG identifier protected (encrypted and/or integrity protected). The method can be used to define how the network will perform the subscription check for the received CAG identifier. In addition to, the method can also be defined how to perform resume procedure on a CAG cell when the UE is in 5GMM-CONNECTED with inactive indication or 5GMM-IDLE with suspend indication.

Referring now to the drawings, and more particularly to FIGS. 1 through 17e, there are shown preferred example embodiments.

FIG. 1 is a sequence flow diagram illustrating various operations for sending CAG identifier with encryption when the UE (100) sends privacy protected CAG ID to the network, according to an example embodiment as disclosed herein.

The method can be used to prevent privacy exposure of UEs (100) accessing public network integrated non-public networks (PNiNPN) using the CAG cells, and also prevent identification of a set of UEs accessing NPN via the CAG cell. A problem addressed is the UE (100) sending CAG Identifier over the air in clear format. Various example embodiments described below address this problem by protecting (e.g., encryption and/or integrity protected) the CAG identifier sent over the air to prohibit a man-in-the-middle attacker from identifying the NPN/CAG Cell that the UE (100) is attempting to access.

In an example embodiment, if the de-concealment of a privacy protected CAG Identifier (CCAG ID) fails at the network (i.e., UDM (400a)/AUSF (500)), the serving network (AMF (300a)) sends a Registration Reject message to the UE (100) with an appropriate cause value. After the successfully de-concealing CCAG ID (i.e., UE (100) has sent valid CAG ID), at the network (UDM (400a)/AUSF), the network proceeds with primary authentication procedure as specified in TS 33.501.

In an example embodiment, if the SEAF (300b) and the AMF (300a) are not co-located, then the AMF (300a) connects to the AUSF via the SEAF (300b). In another embodiment, if the SEAF (300b) and the AMF (300a) are co-located, then the term "AMF" means "AMF/SEAF" throughout this document.

In an example embodiment, in order to support the CAG, if the UE (100) is configured by a home network with the Allowed CAG List, the home network may also provision the CAG identifiers to be privacy protected. Based on this configuration from the home network, the UE (100) may apply for privacy protection on the CAG ID (sent to the serving network over the air by the UE (100)) when accessing the NG-RAN (200) using the CAG cell.

In an example embodiment, the non-public network identifier (NPN ID) is used, instead of the CAG Identifier (CAG ID) or in addition to the CAG identifier (CAG ID), for identification of non-public network and check, whether the UE (100) is subscribed and authorized to access the particular non-public network. The NPN-ID is used for the stand-alone non-public networks (i.e. Networks that are not relying on network functions of a public PLMN). Throughout this document, the term "CAG Identifier" and "non-public network identifier" are used interchangeably. In some scenarios, the CAG ID means CAG-ID and/or NPN-ID.

In an example embodiment, when the UDM (400a) de-conceals a protected CAG ID, it may perform subscription check of CAG ID for the UE (100) (SUPI). If such a check is performed, the UDM (400a) returns a de-concealed CAG ID to the serving network only if the CAG ID is in Allowed CAG List of the UE (100), if it is not in the list, the UDM (400a) may return reject to the serving network with appropriate cause value. The following example alternatives consider that a subscription check is not performed at the UDM (400a).

Example Alternative 1 (the UE (100) sends privacy protected CAG ID to the network, during service request or registration management procedures, when the UE (100) does not have a valid security context (i.e., the UE (100) does not have the Globally Unique Temporary Identifier (GUTI) or the stored GUTI is not valid), the UE sends a privacy protected CAG Identifier (CAG ID) to the serving network in AN Parameters, if the UE is accessing the NG-RAN using the CAG cell. This privacy protected CAG Identifier is referred as a Concealed CAG Identifier (CCAG ID) in the disclosure. The UE (100) constructs the CCAG ID, and sends it to the serving network in the AN parameters. The serving network (i.e., AMF (300*a*)) receives the concealed CAG ID (CCAG ID) from the UE (100) in the registration request message or from the NG-RAN (200) (for example, over N2 message the NG-RAN (200) in N2 parameters). The N2 parameters are information elements sent in a NGAP message on a N2 interface. The serving network's AMF (300*a*) forwards the CCAG ID to the UDM (400*a*) of the home network. The UDM (400*a*) de-conceals the CCAG ID and provides the CCAG ID to the serving network.

The AMF (300*a*)/SEAF (300*b*) receives the de-concealed CAG ID directly from the UDM (400*a*) (in the HPLMN). The UDM (400*a*) may offer service (for illustration purposes, Nudm_XXX over Nudm (Service-based interface exhibited by the UDM (400*a*)) or using an N8 interface specified in TS 23.501) to the serving network's AMF (300*a*) (it is possible that the serving network also belongs to the HPLMN), for de-concealing of CCAG ID. During the UE's Request, the AMF (300*a*) gets the CCAG ID from the UE (100) (from the UE (100) in a Request message), either in the Request message or from the NG-RAN (200) (for example, over an N2 message)). The AMF (300*a*) requests the de-concealed CAG ID from the UDM (400*a*), through Nudm_XXX service. The UDM (400*a*) de-conceals the CCAG ID from the AMF's (300*a*) request message to the CAG ID. Then, the UDM (400*a*) responds to AMF's request, based on the result of the de-concealment of CCAG ID. If the response from the UDM (400*a*) has the CAG ID, then the AMF (300*a*) stores the CAG ID that the UE (100) requested for further procedures.

Figure 2:
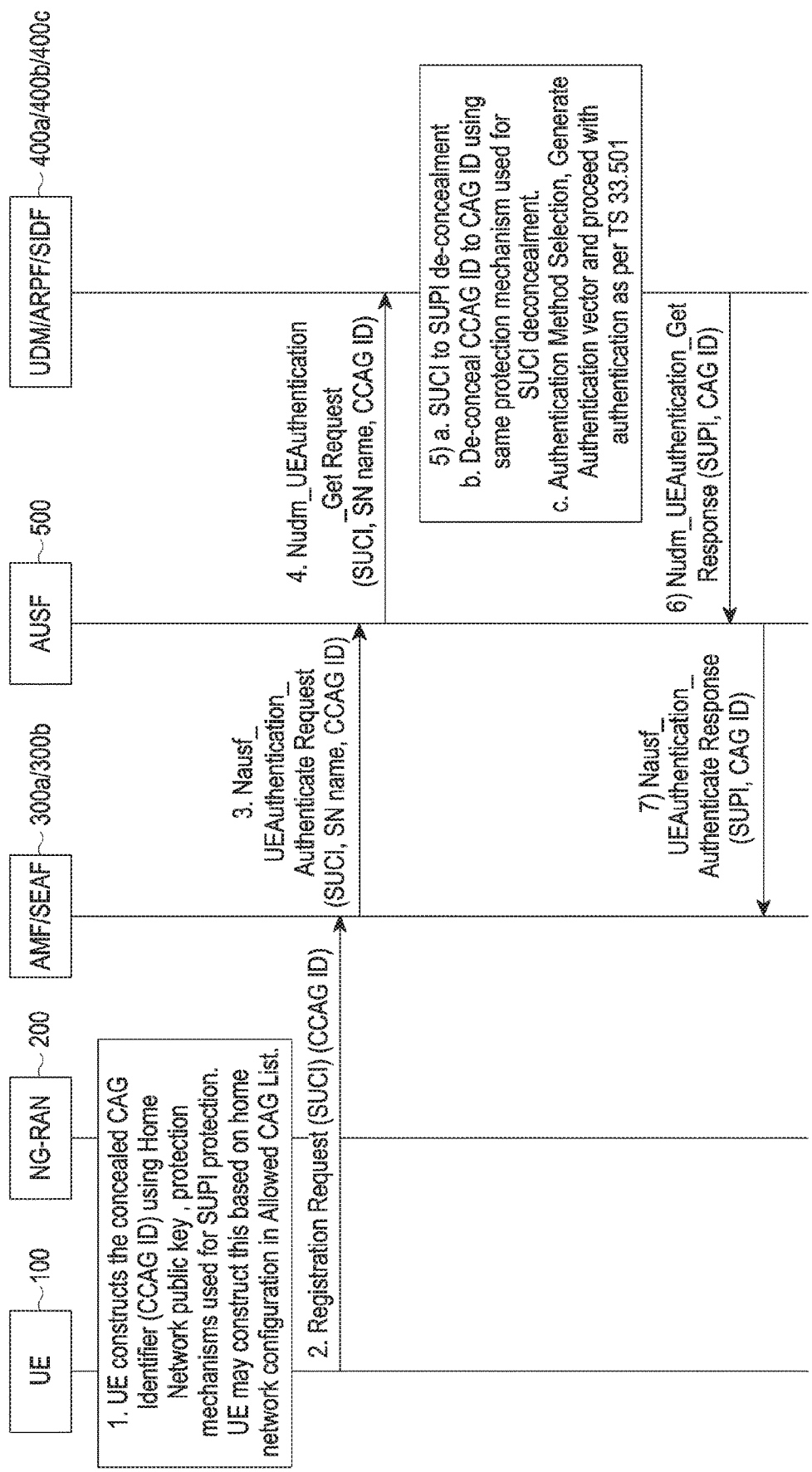
FIG. 2 is a sequence flow diagram illustrating method for sending CAG identifier with encryption for UDM de-conceals Concealed CAG ID using asymmetric encryption mechanism upon UE Authentication from AUSF, according to an example embodiment as disclosed herein.

FIG. 2 is a sequence flow diagram illustrating various methods for sending the CAG identifier with encryption for the UDM (400*a*) to de-conceal the concealed CAG ID using an asymmetric encryption mechanism after the UE (100) is authenticated by the AUSF (500), according to an example embodiment as disclosed herein.

Example Alternative 1.a (the UDM (400*a*) de-conceals Concealed CAG ID using asymmetric encryption mechanism upon the UE (100) authentication from the AUSF (500)). During the service request or the registration management procedures, when the UE (100) does not have a valid security context (i.e., the UE (100) does not have a GUTI or the stored GUTI is not valid), the UE (100) sends a privacy protected CAG Identifier (CCAG ID) to the serving network in AN Parameters, if the UE (100) is accessing the NG-RAN (200) using the CAG cell.

The CCAG ID is constructed by the UE (100) using a Home network public key, a protection scheme, and a method used for concealing UE identifier in the SUCI. The UE (100) constructs the CCAG ID and sends it to the serving network in the AN parameters. The serving network's AMF (300*a*) receives the concealed CAG ID (CCAG ID) from the NG-RAN (200) in N2 parameters. The serving network's AMF (300*a*) forwards the CCAG ID to the UDM (400*a*) of the home network in the authentication request via the AUSF. The UDM (400*a*) de-conceals the CCAG ID and provides it to the serving network AMF (300*a*) via the AUSF (500), upon successful the primary authentication.

As part of the registration request procedure, the serving network's the AMF (300*a*)/SEAF (300*b*) (it is possible that the serving network also belongs to the HPLMN) initiates a primary authentication procedure by including the Concealed CAG identifier (CCAG ID) in an Nausf_UEAuthentication_Authenticate request message to the AUSF (500) along with other possible parameters. The AMF (300*a*) receives the CCAG ID from the UE (100) in the registration request message or from the NG-RAN (for example, over N2 message). The AUSF (500) includes the CCAG ID in Nudm_UEAuthentication_Get_Request message to the UDM (400*a*) along with other possible parameters. In an example embodiment, the Nudm_UEAuthentication_Get_Request message shared with the ARPF (400*b*)/SIDF (400*c*). The UDM (400*a*) de-conceals the SUCI and the CCAG ID included in the Nudm_UEAuthentication_Get_Request message. The UDM (400*a*) de-conceals CCAG ID using the same parameters like the home network public key and the protection mechanism and method used for de-concealing UE identifier in the SUCI. If the SUCI and CCAG ID are de-concealed successfully, then the UDM (400*a*) proceeds with the procedures as specified in TS 33.501. The UDM (400*a*) includes CAG ID and SUPI in the response message to the AUSF (500) and the AUSF (500) forwards them to the AMF (300*a*)/SEAF (300*b*) upon successful authentication.

As the home network public key and protection scheme used for the SUCI and CCAG ID derivation are same, the UDM (400*a*) that de-conceals the SUCI will also be able to de-conceal the CCAG ID. Sending a concealed CAG ID (CCAG ID) over the air to the network prevents a man-in-the middle attacker from identifying the NPN/CAG Cell that the UE (100) is attempting to access.

In an example embodiment, when the serving network's AMF (300*a*) receives a CAG ID from the UE (100) with UE's identity as the SUCI (Concealed Subscription Identifier SUPI), then the AMF (300*a*) considers the received CAG ID is a concealed CAG ID (CCAG ID) and forwards the CCAG ID along with the SUCI to the UDM (400*a*) of the home network for de-concealment of the CCAG ID. If the serving network's AMF (300*a*) receives the CAG ID from the UE (100) with UE's identity as a 5G GUTI (UE's 5G temporary identifier), then the AMF (300*a*) considers the received CAG ID in the protected NAS container as not concealed.

Figure 3:
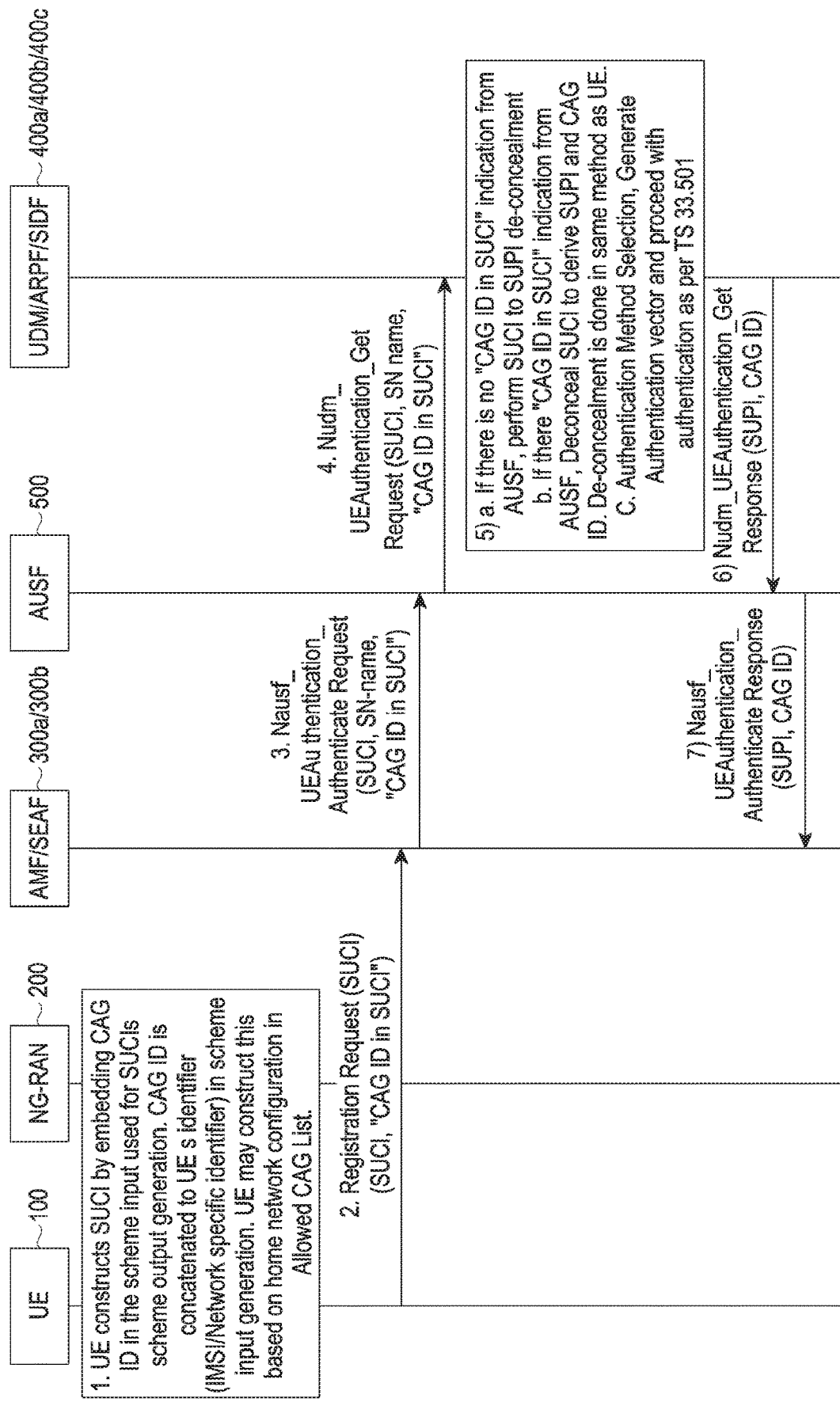
FIG. 3 is a sequence flow diagram illustrating an alternative method for sending CAG identifier with encryption for UDM de-conceals Concealed CAG ID using asymmetric encryption mechanism upon UE Authentication from AUSF, according to an example embodiment as disclosed herein.

FIG. 3 is a sequence flow diagram illustrating alternative various operations for sending CAG identifier with encryption for the UDM to de-conceal a Concealed CAG ID using an asymmetric encryption mechanism upon the UE authentication from the AUSF (500), according to an example embodiment as disclosed herein.

Example Alternative 1.b (UDM (400*a*) de-conceals the Concealed CAG ID using an asymmetric encryption mechanism upon UE Authentication from the AUSF (500), during service request or the registration management procedures, when the UE (100) does not have a valid security context (i.e., the UE (100) does not have the GUTI or the stored GUTI is not valid), then the UE (100) protects the CAG Identifier (CAG ID of the CAG cell that the UE (100) attempts to access) by embedding it in the UE's SUCI, which is sent by the UE (100) to the serving network as the UE identifier, if the UE (100) is accessing the NG-RAN (200) using the CAG cell.

The CAG ID is embedded into the SUCI as follows:
1. During the calculation of the SUCI, the UE (100) concatenates the CAG ID with MSIN/Username and generates the home network public key and protection scheme output of the SUCI.
2. When the SUPI is of type IMSI, the subscription identifier part of the IMSI (i.e., MSIN) is concatenated with CAG ID to construct the scheme input and generate the scheme output of the SUCI.

3. When the SUPI is of type network-specific identifier, the subscription identifier part of the SUPI is concatenated with CAG ID and used to construct the scheme input and the generate scheme output of the SUCI.

In an example embodiment, the home network public key and protection scheme output is determined based on an elliptic curve cryptography (ECC) ephemeral public key, a cipher text value, and a Medium Access Control (MAC) tag value.

In an example embodiment, the home network public key and protection scheme input is determined by the protected CAG ID, a public key of a home network and an elliptic curve cryptography (ECC) ephemeral public and private key pair according to an Elliptic Curve Integrated Encryption Scheme (ECIES) parameters provisioned by the home network.

When the UE (100) constructs the SUCI by embedding CAG ID in the SUCI and sends it to serving network as the UE identifier, the UE (100) sends an indicator to the serving network's AMF (300a) that the CAG ID is embedded in the SUCI ("CAG ID in SUCI"), along with the UE's SUCI. The serving network's AMF (300a), upon receiving the SUCI with an indicator of "CAG ID in the SUCI", forwards the UE's SUCI and CAG ID indication ("CAG ID in SUCI") to the UDM (400a) of the home network in the authentication request via the AUSF (500). Based on the CAG ID indication, the UDM (400a) de-conceals the SUCI to derive the SUPI and CAG ID and provides them to the serving network AMF (300a) via the AUSF (500), upon successful primary authentication.

As part of the registration request procedure, the serving network's AMF (300a)/SEAF (300b) (it is possible that the serving network also belongs to the HPLMN) initiates a primary authentication procedure by including the UE's SUCI along with "CAG ID in the SUCI" indication in a Nausf_UEAuthentication_Authenticate request message to the AUSF (500) along with other possible parameters (e.g., serving network information). The AMF (300a) receives the SUCI and the "CAG ID in SUCI" indication from the UE (100) in the registration request message or from the NG-RAN (200) (for example, over N2 message). The AUSF (500) includes the SUCI and "CAG ID in SUCI" indication in Nudm_UEAuthentication_Get_Request message to the UDM (400a) along with other possible parameters. Based on "CAG ID in SUCI" indication from the AUSF (500), the UDM (400a) performs procedures to de-conceal the SUCI to the SUPI and the CAG ID. The UDM (400a) de-conceals the SUCI to identify/derive the SUPI and the CAG ID, using the same mechanisms used for concealing SUPI by the UE (100). If the SUCI and the CCAG ID are de-concealed successfully, then the UDM (400a) proceeds with the procedures as specified in TS 33.501. The UDM (400a) includes the CAG ID and SUPI in the response message to the AUSF (500), and the AUSF (500) forwards them to the AMF (300a)/SEAF (300b) upon successful authentication.

As home network public key and protection scheme used for SUCI and CCAG ID derivation are same, the UDM (400a) that de-conceals SUCI will also be able to de-conceal CAG ID. Sending the CAG ID concealed in the SUCI over the air to the network prevents a man-in-the-middle attacker from identifying the NPN/CAG Cell that the UE (100) is attempting to access.

Figure 4:
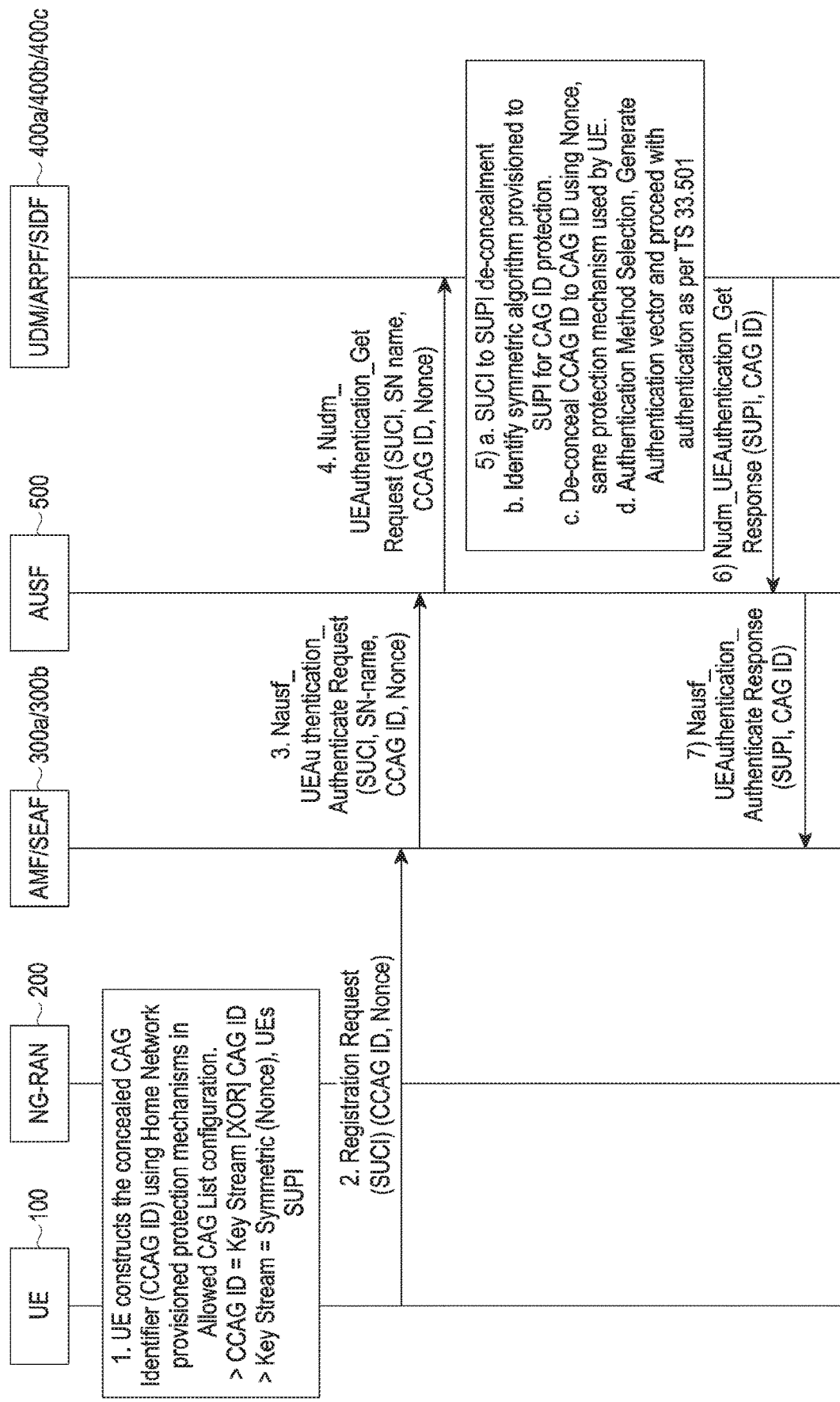
FIG. 4 is a sequence flow diagram illustrating another alternative method for sending CAG identifier with encryption for UDM de-conceals Concealed CAG ID using symmetric encryption mechanism upon UE Authentication from AUSF, according to an example embodiment as disclosed herein.

FIG. 4 is a sequence flow diagram illustrating another alternative example method for sending CAG identifier with encryption for the UDM to de-conceal the Concealed CAG ID using an symmetric encryption mechanism upon the UE authentication from the AUSF (500), according to an example embodiment as disclosed herein.

Example Alternative 1.c: The UDM (100) de-conceals the Concealed CAG ID using a symmetric encryption mechanism upon UE Authentication from the AUSF (500). During service request or registration management procedures, when the UE (100) does not have a valid security context (e.g., the UE (100) does not have the GUTI or the stored GUTI is not valid), the UE (100) sends a privacy protected CAG Identifier (CCAG ID) to the serving network in AN Parameters if the UE (100) is accessing the NG-RAN (200) using the CAG cell.

The UE (100) constructs the CCAG ID as follows:
1. Generate a random value called Nonce.
2. The home network provisions/configures the UE (100) with a symmetric encryption algorithm to be used to for protecting CAG IDs in the provisioned Allowed CAG List.
3. The UE (100) generates the key stream with the Nonce and the UE's SUPI as a key to the symmetric encryption algorithm.
4. The generated Key Stream is XORed with the CAG ID to generate the CCAG ID.

The UE (100) constructs the CCAG ID and sends the CCAG ID and Nonce to the serving network in AN parameters. As part of Registration Request procedure, the serving network's AMF (300a)/SEAF (300b) (it is possible that the serving network also belongs to the HPLMN) initiates a primary authentication procedure by including the Concealed CAG identifier (CCAG ID) and Nonce in a Nausf_UEAuthentication_Authenticate request message to the AUSF (500) along with other possible parameters. The AMF (300a) receives the CCAG ID and Nonce from the UE (100) in the Registration Request message or from the NG-RAN (200) (for example, over N2 message). The AUSF (500) includes the CCAG ID and Nonce in a Nudm_UEAuthentication_Get_Request message to the UDM (400a) along with other possible parameters. The UDM (400a) performs procedures to de-conceal the SUCI and CCAG ID included in the Nudm_UEAuthentication_Get_Request message. The UDM (400a) de-conceals the SUCI and identifies the UE (100) (SUPI). Based on the SUPI, the UDM (400a) identifies the symmetric encryption algorithm to be used to de-conceal the CCAG ID. Like the UE (100), the UDM (400a) uses the Nonce, SUPI, as input parameters and de-conceals the CCAG ID. If the SUCI and CCAG ID are de-concealed successfully, then the UDM (400a) proceeds with the procedures as specified in TS 33.501. The UDM (400a) includes the CAG ID and SUPI in the response message to the AUSF (500), and the AUSF (500) forwards them to the AMF (300a)/SEAF (300b) upon successful authentication.

Sending a concealed CAG ID (CCAG ID) over the air to the network prevents a man-in-the-middle attacker from identifying the NPN/CAG Cell that the UE (100) is attempting to access.

Example Solution 2: The UE (100) sends the CAG ID to the network after security context establishment, during service request or registration management procedures, when the UE (100) does not have a valid security context (UE does not have a GUTI or the stored GUTI is not valid), the UE does not send the CAG Identifier to the serving network. After successful primary authentication and NAS and the RRC security context being established between the UE and the serving network, the UE will send the CAG ID to the serving network if the UE is accessing the NG-RAN using a CAG cell.

Figure 5:
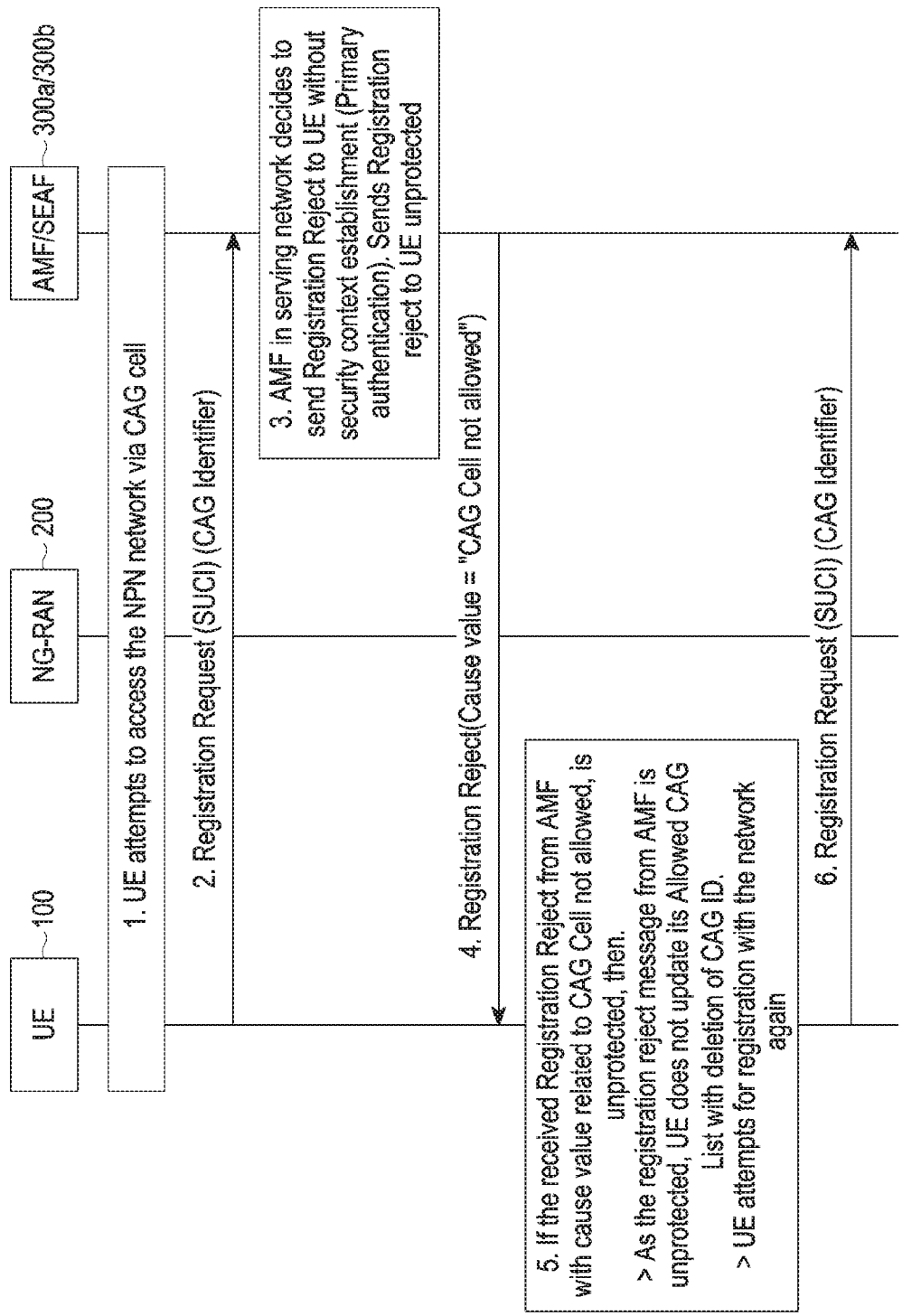
FIG. 5 is a sequence flow diagram illustrating method for handling of 5GMM cause value "CAG cell not allowed" when received without integrity protection, according to an example embodiment as disclosed herein.

FIG. 5 is a sequence flow diagram illustrating various example processes for handling of the 5GMM cause value "CAG cell not allowed" when received without integrity protection, according to an example embodiment as disclosed herein.

The example procedures can be used to prevent denial of service on a UE (100) accessing public network integrated non-public networks (PNiNPN) using a CAG cell. One example issue to consider is the UE (100) updating its home network configured Allowed CAG list upon receipt of an unprotected NAS reject message for the CAG ID access request.

During the service request or the registration management procedures, the UE (100) does NOT update its "Allowed CAG List" upon receipt of an unprotected NAS reject message for the CAG ID access request. Preventing the UE (100) from updating its configuration (Allowed CAG List) upon receipt of unprotected NAS reject messages prevents the UE (100) from denial of service to the public network integrated non-public networks (PNiNPN) using the CAG cells. Upon receipt of unprotected NAS reject message for the CAG ID access request, the UE (100) re-attempts to register to the network again for X number of times and/or in periodic time intervals. This number of re-attempts (X) and/or periodic time intervals may be configured in the UE (100) or received by the UE (100) from the AMF (300*a*).

Further, the UE (100) stores the PLMN Specific attempt counter value in the ME's memory (like NV RAM) or USIM, during a power cycle. The UE (100) uses the same stored value after power on so that re-attempts can be avoided.

As shown in the FIG. 5, at step 1, the UE (100) attempts to access the NPN network via the CAG cell. At step 2, the UE (100) sends the registration request including the SUCI and the CAG Identifier to the AMF (300*a*)/SEAF (300*b*). At step 3, the AMF (300*a*) in the serving network decides to send a registration reject message to the UE (100) without security context establishment (i.e., primary authentication). The AMF (300*a*)/SEAF (300*b*) sends the registration reject message to the UE (100) in an unprotected format. At step 4, the AMF (300*a*)/SEAF (300*b*) sends the registration reject (with Cause value=CAG Cell not allowed) to the UE (100). At step 5, if the received registration reject message from the AMF (300*a*)/SEAF (300*b*) with a cause value related to CAG Cell not allowed, is unprotected, then, as the registration reject message from the AMF is unprotected, the UE (100) does not update its Allowed CAG List with deletion of CAG ID. Further, the UE (100) attempts to register with the network again. At step 6, the UE (100) sends the registration request message including the SUCI and the CAG Identifier to the AMF (300*a*)/SEAF (300*b*).

Figure 6:
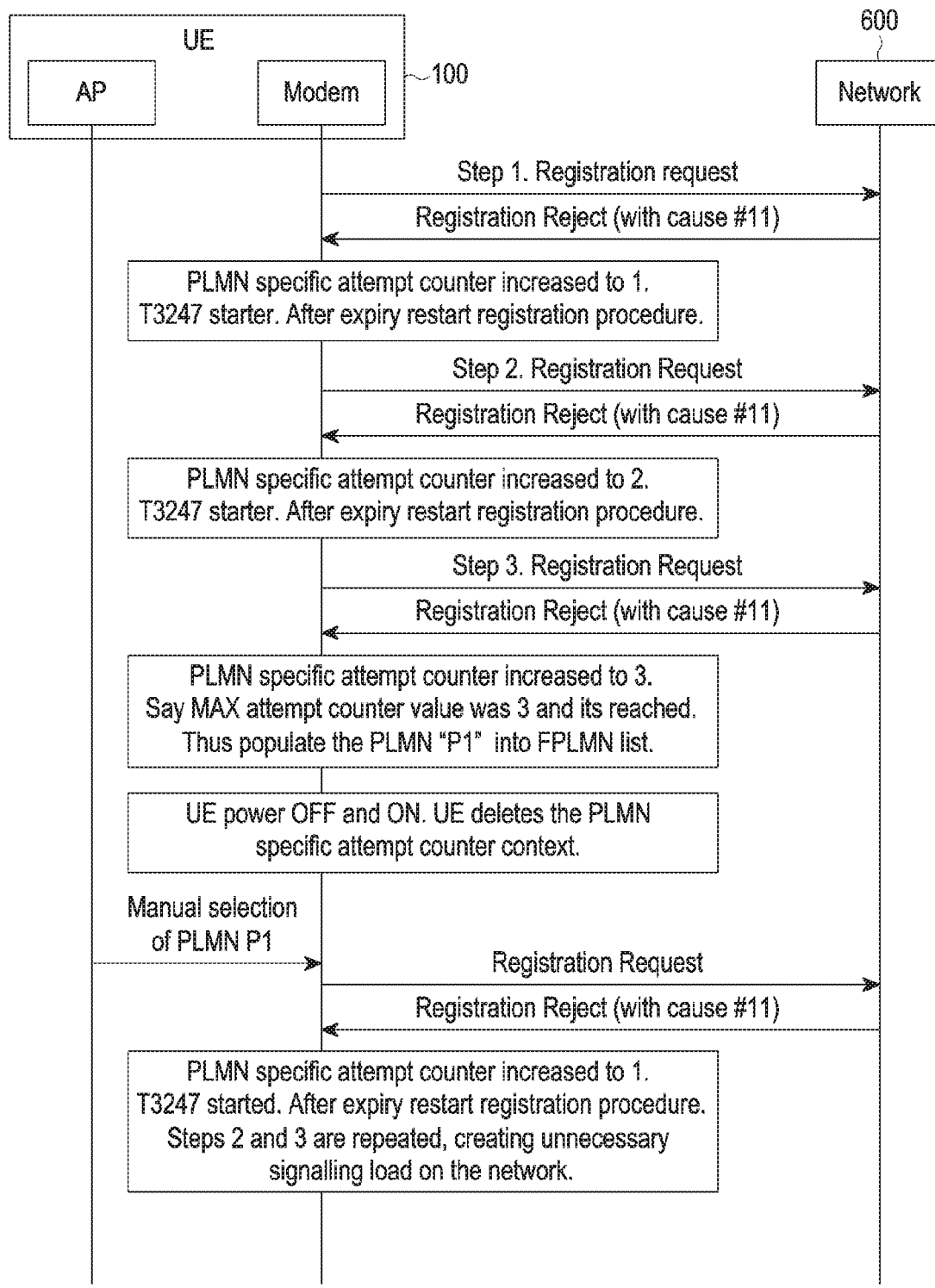
FIG. 6 is a sequence flow diagram illustrating method for handling of a Registration Reject message when received without integrity protection, according to an example embodiment as disclosed herein.

FIG. 6 is a flow diagram illustrating various methods for handling of a registration reject message when received without integrity protection, according to an example embodiment as disclosed herein.

After power ON of the UE (100), the UE (100) sets the PLMN specific attempt counter value to MAX for all the PLMN's which are part of a forbidden PLMN list. Though this example embodiment is described from a PLMN-specific attempt counter perspective, similar issues and approaches are applicable for PLMN-specific PS-attempt counters, a counter for "SIM/USIM considered invalid for non-GPRS services" events, and a counter for "SIM/USIM considered invalid for GPRS services" events.

At step 1, the UE's modem sends the registration request message to the network (600). Based on the registration request message, the network (600) sends a registration reject message with cause #11 to the UE's modem. Based on the registration reject message with cause #11, a PLMN specific attempt counter is increased to 1, a NAS timer T3247 is started. After expiry of the T3247 timer, the restart registration procedure is started.

At step 2, the UE's modem sends a registration request message to the network (600). Based on the registration request message, the network (600) sends a registration reject message with cause #11 to the UE's modem. Based on the registration reject message with cause #11, PLMN specific attempt counter is increased to 2, the NAS timer T3247 is started, and after expiry of the T3247, the restart registration procedure is started.

At step 3, the UE's modem further sends the registration request message to the network (600). Based on the registration request message, the network (600) sends the registration reject message with cause #11 to the UE's modem. Based on the registration reject message with cause #11, the PLMN specific attempt counter is increased to 3. Assume for example a MAX attempt counter value of 3. In this case, the PLMN "P1" is populated into a FPLMN list. The UE (100) powers OFF and ON. The UE (100) deletes the PLMN specific attempt counter context. The UE's AP sends manual selection of PLMN P1 to the UE's modem.

Then, the UE's modem sends the registration request message to the network (600). Based on the registration request, the network (600) sends a registration reject message with cause #11 to the modem. Based on the registration reject message with cause #11, the PLMN specific attempt counter is increased to 1, timer T3247 is started. After expiry of T3247, the registration procedure is re-started and steps 2 and 3 are repeated, but this creates an unnecessary signalling load on the network.

Figure 7:
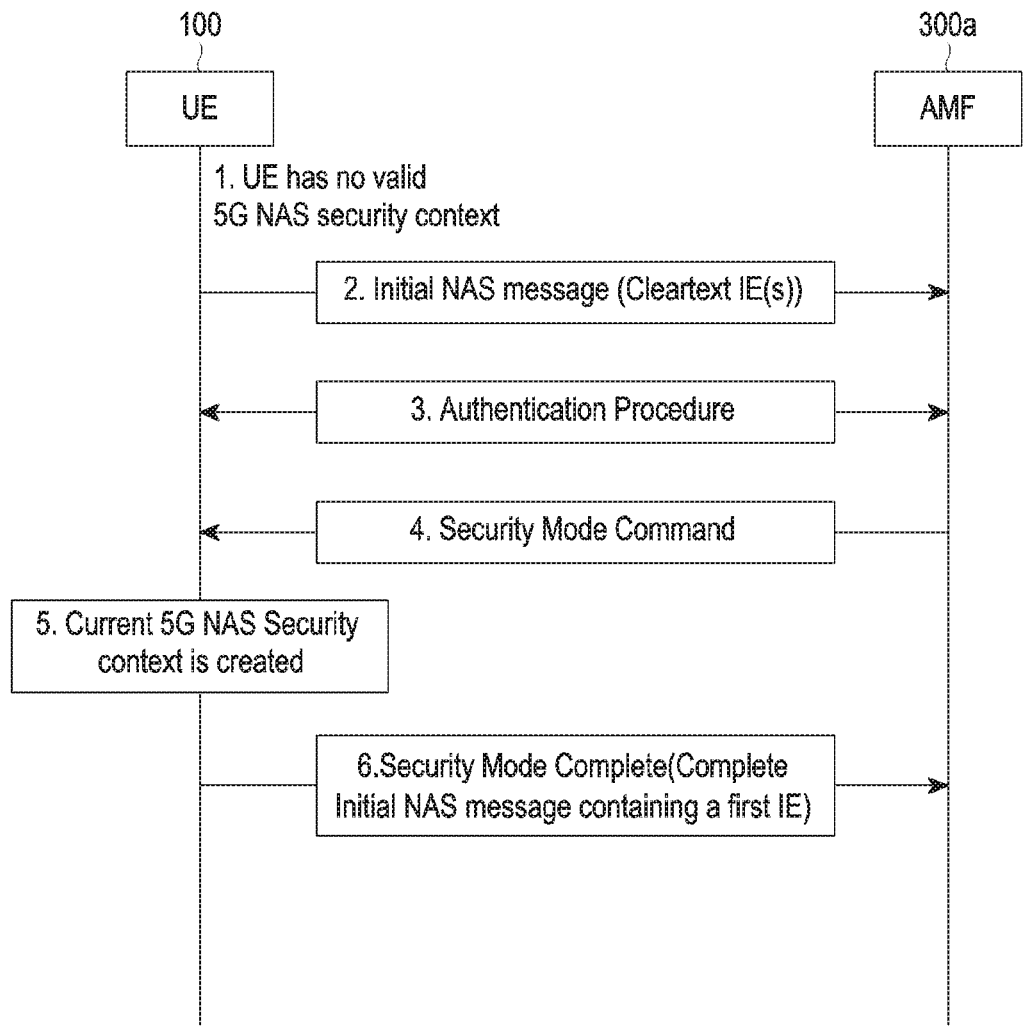
FIG. 7 is a sequence flow diagram illustrating method for transmission of information element in Initial NAS message transmission procedure, according to an example embodiment as disclosed herein.

FIG. 7 is a sequence flow diagram illustrating various example operations for transmission of an information element in an initial NAS message transmission procedure, according to an example embodiment as disclosed herein.

In an example embodiment,
1. The UE (100) does not have a valid 5G Non Access Stratum (NAS) security context.
2. The UE (100) needs to send an initial NAS message and a first Information Element (IE) to the AMF 300*a*. The UE (100) sends the initial NAS message with cleartext IE(s) only. The UE (100) does not include the first information element in the initial NAS message.
3. The network (5G Core) performs a 5G Authentication procedure. The UE (100) establishes the 5G NAS security context.
4. The network sends a security mode command NAS message to the UE (100).
5. After receiving the security mode command NAS message, the 5G NAS security context created in the step 2 becomes the current 5G NAS security context.
6. The UE (100) transmits a security mode complete NAS message containing a complete Initial NAS message that contains the first IE. The security mode complete NAS message is ciphered with the current 5G NAS security context.
7. The first IE in the above steps may contain at least one of the following information elements:
   I. Low Access priority Indication,
   II. Strictly Periodic Registration Timer Indication,
   III. Extended Discontinuous Reception (eDRX), and
   IV. Closed Access Group (CAG) Identifier.
8. The initial NAS message in the above steps is sent when the UE (100) is in the 5G Mobility Management (5GMM)-IDLE state (e.g., Registration Request message, Service Request message, or Deregistration Request message).

In another example embodiment,
1. The UE (100) does not have a valid 5G NAS security context.
2. The UE (100) needs to send the initial NAS message and a first Information Element (IE). The UE sends the initial NAS message with cleartext IE(s) only and the UE (100) includes the first information element in the initial NAS message.
3. The first IE in the above steps may contain at least one of the following information elements:
   I. Low Access priority Indication,
   II. Strictly Periodic Registration Timer Indication,
   III. Extended Discontinuous Reception (eDRX), and
   IV. Closed Access Group (CAG) Identifier
4. The initial NAS message in the above steps is sent when the UE (100) is in a 5G Mobility Management (5GMM)-IDLE state (e.g., Registration Request message, Service Request message, or Deregistration Request message)

As shown in the FIG. 7, at step 1, the UE (100) has no valid 5G NAS security context. At step 2, the UE (100) sends the initial NAS message (Cleartext IE(s)) to the AMF (300a). Based on the initial NAS message, an authentication procedure is performed between the UE (100) and the AMF (300a) at step 3. At step 4, the AMF (300a) sends a security mode command to the UE (100). At step 5, the current 5G NAS security context is created at the UE (100). At step 6, the UE (100) sends a security mode complete message (i.e., complete Initial NAS message containing a first IE) to the AMF (300a).

Figure 8:
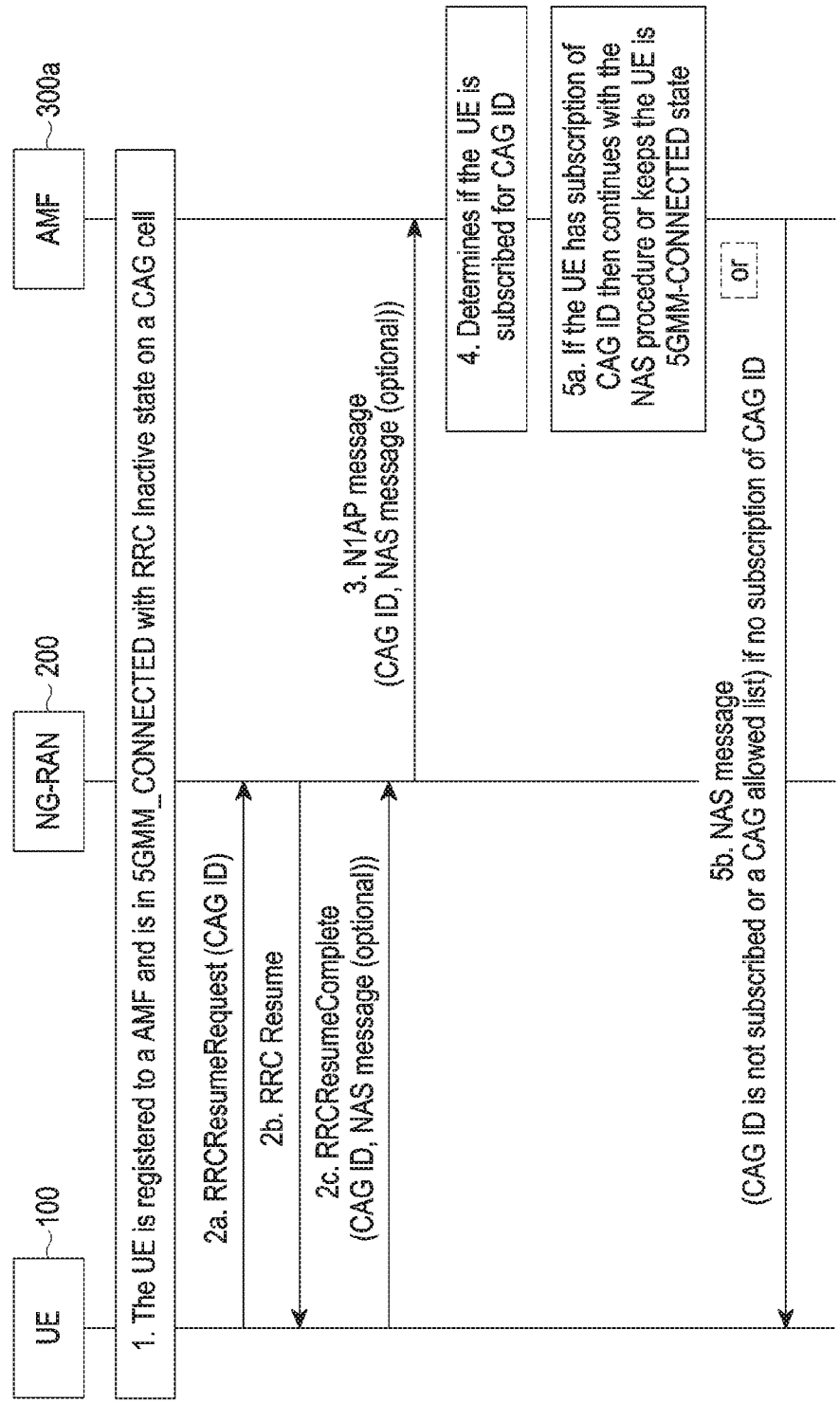
FIG. 8 is a sequence flow diagram illustrating method for transmission of CAG identifier during the resume procedure, according to an example embodiment as disclosed herein.

FIG. 8 is a sequence flow diagram illustrating various operations for transmission of CAG identifier during the resume procedure, according to an example embodiment as disclosed herein.

Step 1: The UE (100) is camped on the CAG cell and registered to the Public network integrated NPN. The UE (100) has a valid subscription for the CAG cell. The UE (100) is in the 5GMM-CONNECTED mode with a RRC inactive indication. The CAG cell broadcasts the single CAG ID.

Step 2: The UE (100) performs a Resume procedure on the CAG cell. The UE (100) sends the CAG ID of the cell during the Resume procedure in the RRC message. For example, the UE (100) sends the CAG ID of the CAG cell in a RRCResumeRequest message or a RRCResumeComplete message or in a new RRC message or in an existing RRC message for NR. For ng-eNB, the UE (100) sends the CAG ID for the CAG cell in the RRCConnectionResume message or the RRCConnectionResumeComplete message. In an example embodiment, the UE may send the RRC Resume request without the CAG ID.

At step 2a, the UE (100) sends the RRCResumeRequest message including the CAG ID to the NG-RAN (200). In an example embodiment, the UE may send the RRCResumerequest message without the CAG ID. Based on the RRCResumeRequest, the NG-RAN (200) sends the RRCResume message to the UE (100) at step 2b. At step 2c, the UE (100) sends the RRCResumeComplete message including the CAG ID and the NAS message. In an example embodiment, the NAS message is optional.

At step 3: The NG-RAN (200) forwards the received CAG ID to the AMF (300a) in an existing N1AP message or in a new N1AP message.

Step 4: The AMF (300a) checks whether the UE (100) has the subscription for the CAG ID. If the UE (100) has a subscription for the CAG ID, then the network (i.e., AMF (300a)) keeps the UE (100) in the 5GMM-CONNECTED mode at step 5a. If the UE subscription for the CAG identifier has expired, then the AMF (300a) sends an existing NAS message or a new NAS message indicating to the UE (100) that the subscription of the CAG cell subscription corresponding the CAG ID has expired, at step 5b. After sending the NAS message, the network releases the N1 signalling connection.

In another example embodiment, the CAG cell broadcasts multiple CAG IDs in the CAG cell belonging to the registered Public network integrated NPN and the UE (100) subscribes to multiple CAG IDs broadcasted in the CAG cell. The allowed CAG list in the UE (100) includes more than one CAG IDs broadcasted in the CAG cell. In step 2, when the UE (100) selects the second CAG ID (e.g., when the first CAG identifier is removed from the UE Allowed CAG list), then the one selected in step 1, then the UE (100) sends the second CAG ID in step 2. The UE (100) and the AMF (300a) execute steps 1-4.

Step 5a, if the UE (100) has subscription to the CAG ID, then the AMF continues with the NAS procedure or keeps the UE (100) in the 5GMM-CONNECTED state. In Step 5b, the NAS message (CAG ID is not subscribed or the CAG allowed list) is sent to the UE if there is no subscription to the CAG ID.

Figure 9:
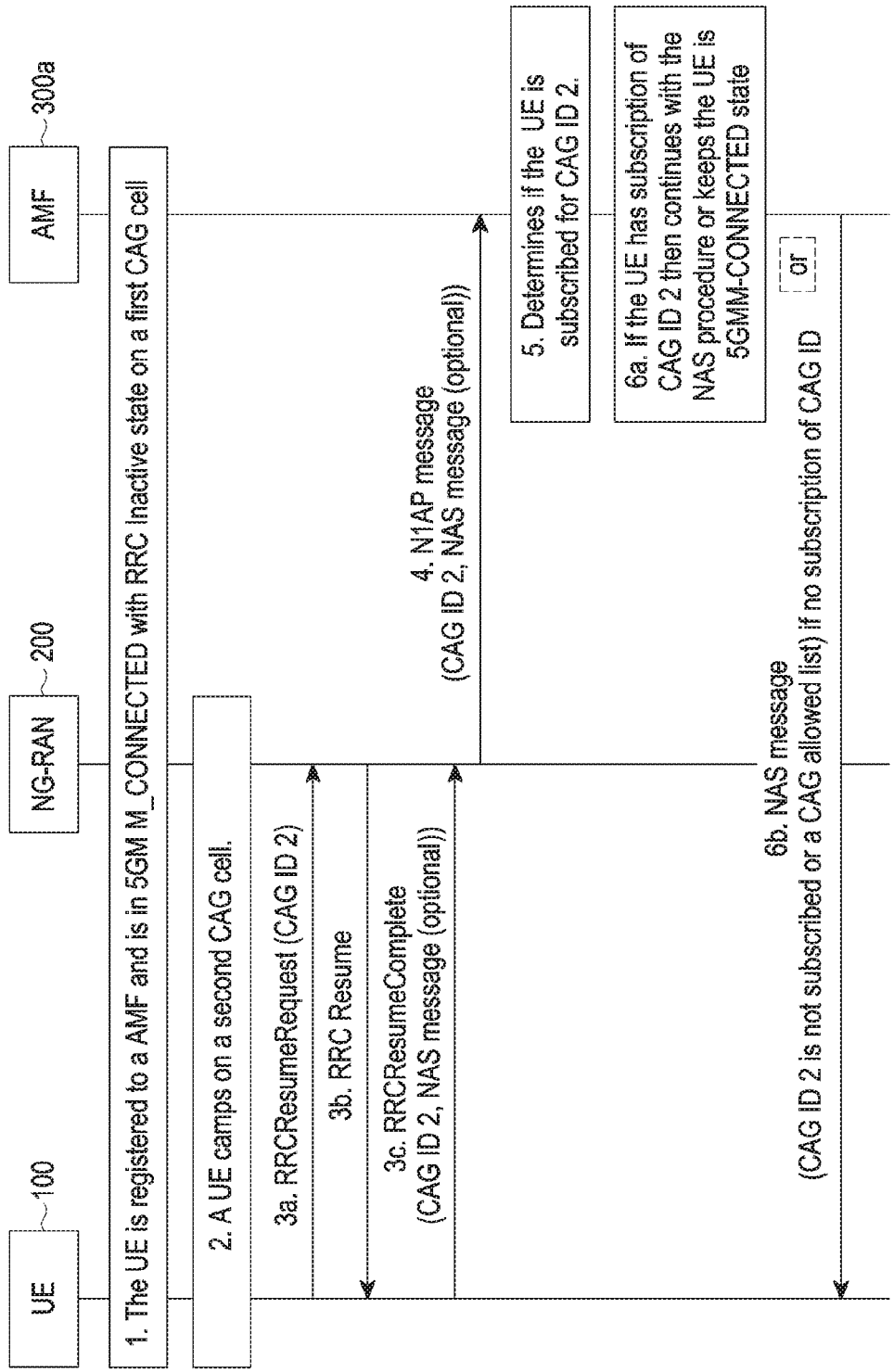
FIG. 9 is a sequence flow diagram illustrating an alternative method for transmission of CAG identifier during the resume procedure, according to an example embodiment as disclosed herein.

FIG. 9 is a sequence flow diagram illustrating an alternative various operations for transmission of CAG identifier during the resume procedure, according to an example embodiment as disclosed herein.

At step 1: The UE (100) is camped on the first CAG cell which broadcasts the CAG identifier 1 and is registered to the public network integrated NPN. The UE (100) has a valid subscription for a first CAG cell and a second CAG cell. The allowed CAG lists for the UE (100) include entries with a CAG Identifier 1 and CAG identifier 2. The UE (100) is in the 5GMM-CONNECTED mode with RRC inactive indication. In an example embodiment, the CAG identifier 1 and CAG identifier 2 belong to a registered Public network integrated NPN.

At step 2, the UE selects a second CAG cell, which broadcasts CAG Identifier 2 but does not broadcast CAG Identifier 1. The second CAG cell may also broadcast a CAG identifier different than the CAG identifier 1 and CAG identifier 2.

At step 3a, the UE (100) sends a RRCResumeRequest message including the CAG ID to the NG-RAN (200). Based on the RRCResumeRequest, the NG-RAN (200) sends a RRCResume message to the UE (100) at step 3b. At step 3c, the UE (100) sends a RRCResumeComplete message including the CAG ID and the NAS message. In an example embodiment, the NAS message is optional. In general, at step 3a-step 3c, the UE (100) selects a second CAG cell, which broadcasts CAG Identifier 2 but does not broadcast CAG Identifier 1. The second CAG cell may also broadcast a CAG identifier different than the CAG identifier 1 and CAG identifier 2.

Further, the UE (100) performs a resume procedure on the second CAG cell upon receiving a request from an upper layer. The UE (100) selects the CAG identifier 2 and the UE (100) sends the CAG identifier 2, during a resume procedure, in the RRC message. In an example, the UE (100) sends the CAG ID of the CAG cell in the RRCResumeRequest or the RRCResumeComplete message or in a new RRC message or in an existing RRC message for NR. For ng-eNB, the UE (100) sends the CAG ID for the CAG cell in the RRCConnectionResume message or RRCConnectionResumeComplete message.

At step 4: The NG-RAN (200) forwards the received CAG Identifier 2 to the AMF (300a) in an existing N1AP message or in a new N1AP message.

At step 5: The AMF (300a) checks whether the UE (100) has a valid subscription for the CAG Identifier 2 or not. The AMF (300a) executes either step 6a or 6b.

At step 6a: If the UE (100) has a valid subscription for the CAG Identifier 2, then the network keeps the UE in the 5GMM-CONNECTED mode. If the AMF (300a) receives the optional NAS message, then the AMF (300a) processes the NAS message.

At step 6b: If the UE subscription for the CAG identifier 2 has expired or the UE (100) has no valid subscription for CAG Identifier 2, then the AMF (300a) sends an existing NAS message or a new NAS message indicating the UE (100) that the subscription of the CAG cell subscription corresponding the CAG Identifier 2 has expired. After sending the NAS message, the network releases the N1 signalling connection.

In an example embodiment, the first CAG cell and the second CAG Cell belong to the same registered area. In another embodiment, the first CAG cell and the second CAG cell does not belong to the same registration area.

In an example embodiment, the NG-RAN (200) stores the CAG cell identifier 1 in step 1. The NG-RAN (200) receives the CAG Identifier in steps 2-3, when the NG-RAN (200) receives the CAG Identifier 2 and NG-RAN (200) determines that CAG identifier 1 and CAG identifier 2 are different, then the NG-RAN (200) executes one of the following steps:
1. The NG-RAN (200) rejects the RRC Resume procedure and sends RRCconnectionReject.
2. The NG-RAN (200) sends a RRC connection setup message establishing the RRC connection and the UE (100) sends a RRC connection setup complete message containing CAG identifier 2.
3. The NG-RAN (200) releases the RRC connection by sending a RRCConnectionRelease message.

Figure 10:
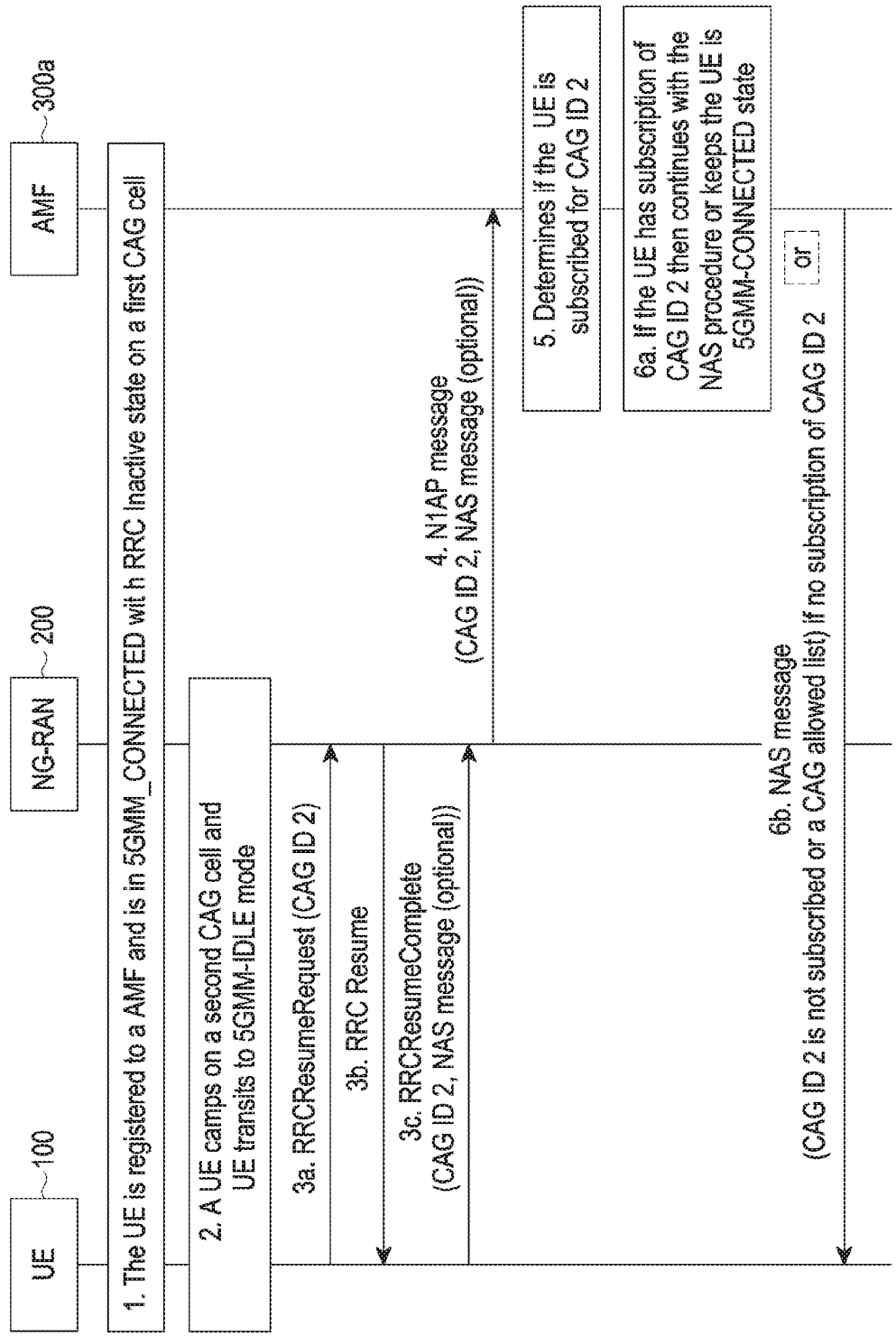
FIG. 10 is a sequence flow diagram illustrating another alternative method for transmission of CAG identifier during the resume procedure, according to an example embodiment as disclosed herein.

FIG. 10 is a flow diagram illustrating alternative various example operations for transmission of the CAG identifier during the resume procedure, according to an example embodiment as disclosed herein.

Step 1: The UE (100) is camped on the first CAG cell which broadcasts the CAG Identifier 1 and is registered to the public network integrated NPN. The UE (100) has a valid subscription for the first CAG cell and the second CAG cell. The UE allowed CAG lists include entries for CAG identifier 1 and CAG identifier 2. The UE (100) is in the 5GMM-CONNECTED mode with a RRC inactive indication. In an example embodiment, the CAG identifier 1 and CAG identifier 2 belong to the registered public network integrated NPN.

Step 2: The UE (100) selects the second CAG cell, which broadcasts CAG identifier 2 but does not broadcast CAG identifier 1. The second CAG cell may broadcast a CAG identifier other than CAG identifier 1 and 2.

The UE (100) transits from the 5GMM-CONNECTED state with RRC inactive to the 5GMM-IDLE mode and releases the stored AS context. Further, the UE (100) establishes the RRC Connection upon receiving a request from the upper layer. The UE (100) sends the CAG identifier 2 during the RRC connection establishment procedure (e.g., in a RRC setup complete message or a RRC connection setup complete message).

At step 3a, the UE (100) sends a RRCResumeRequest message including the CAG ID to the NG-RAN (200). Based on the RRCResumeRequest message, the NG-RAN (200) sends a RRCResume message to the UE (100) at step 3b. At step 3c, the UE (100) sends a RRCResumeComplete message including the CAG ID and a NAS message. In an example embodiment, the NAS message is optional.

Step 4: The NG-RAN (200) forwards the received CAG identifier 2 to the AMF (300a) in an existing N1AP message or in a new N1AP message.

Step 5: The AMF (300a) checks whether the UE (100) has a valid subscription for the CAG identifier 2 or not. If the UE (100) has a valid subscription for the CAG identifier 2, then the network keeps the UE (100) in the 5GMM-CONNECTED mode at step 6a. If the UE subscription for the CAG identifier 2 has expired, then the AMF (300a) sends an existing NAS message or a new NAS message indicating to the UE (100) that the subscription corresponding the CAG identifier 2 has expired at step 6b. After sending the NAS message, the network releases the N1 signalling connection.

In an example embodiment, the AMF (300a) provides an updated Allowed CAG list to the NG-RAN (200). When the NG-RAN (200) receives the CAG identifier during a resume procedure, the NG-RAN (200) determines if the CAG identifier received from the UE (100) is in the Allowed CAG list or not. In an example embodiment, when the NG-RAN (200) receives RRCResumeRequest message, the NG-RAN (200) determines whether at least one CAG ID broadcasted in the CAG cell is in an allowed CAG list of the UE. If the received CAG ID or the at least one CAG ID is in the allowed CAG list, then the NG-RAN (200) proceeds with the resume procedure. Otherwise, the NG-RAN (200) releases the RRC connection and sends an information element (IE) indicating to the UE (100) that the CAG identifier is not subscribed to in an existing RRC message (e.g., RRCConnectionRelease message or RRCConnectionReject message) or a new RRC message. In one example, the information element is sent integrity protected. When the UE (100) receives the information element in the RRC message, the UE (100) removes the sent CAG identifier from the Allowed CAG list. In another embodiment, the NG-RAN (200) sends an entire Allowed CAG list related to the UE (100) in a new RRC message or an existing RRC message. The UE (100), on receiving the Allowed CAG list, replaces a stored Allowed CAG list with the received Allowed CAG list from the NG-RAN (200). In another example embodiment, the NG-RAN (200) includes the CAG identifier and also the information element indicating the UE (100) is not subscribed to the CAG identifier.

Figure 11:
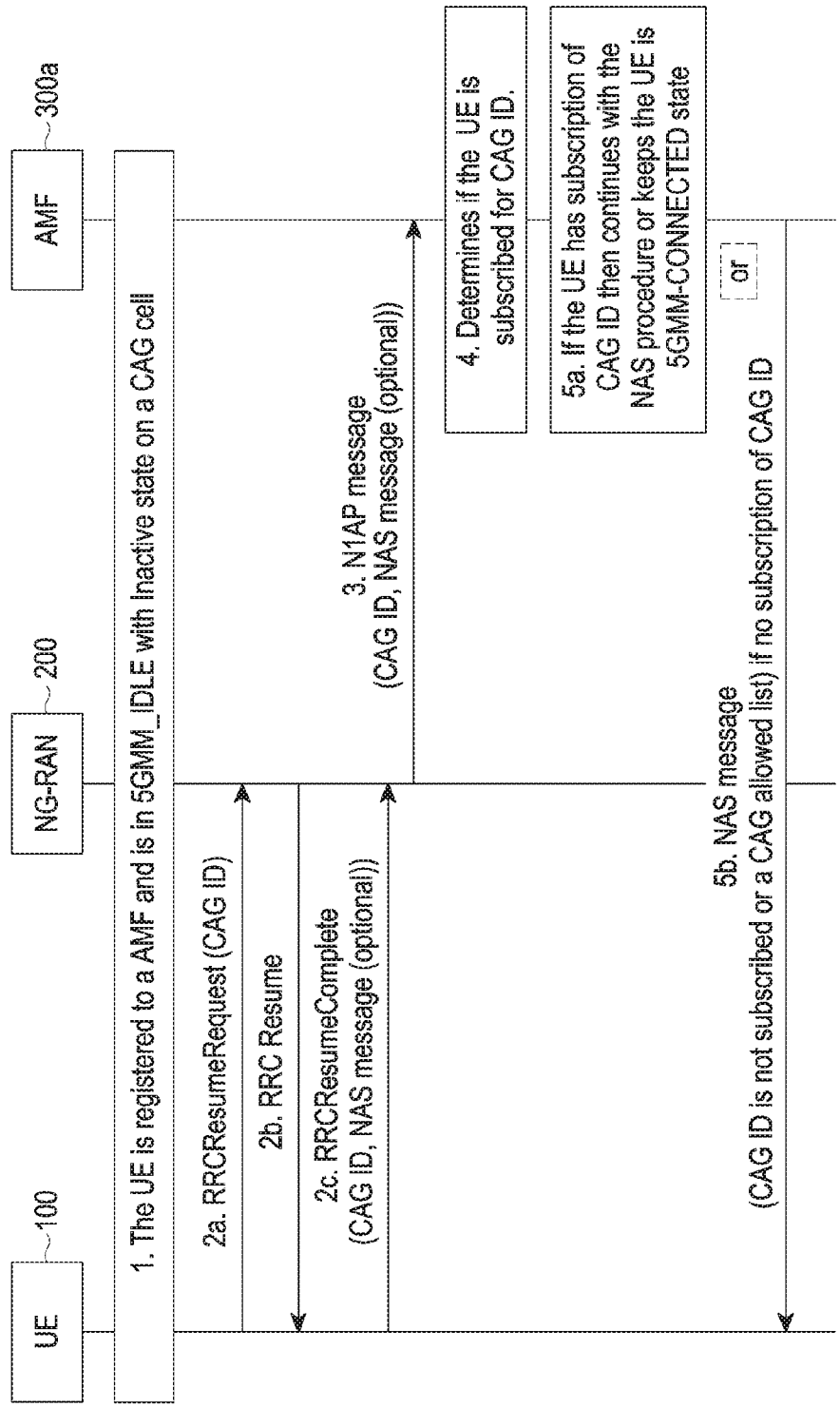
FIG. 11 is a sequence flow diagram illustrating another alternative method for transmission of CAG identifier during the resume procedure, according to an example embodiment as disclosed herein.

FIG. 11 is a sequence flow diagram illustrating another various operations for transmission of CAG identifier during the resume procedure, according to an example embodiment as disclosed herein.

At step 1: The UE (100) is camped on the CAG Cell and registered to the Public network integrated NPN. The UE (100) has a valid subscription for the CAG cell. The UE (100) is in the 5GMM-IDLE mode with suspend indication. The CAG cell broadcasts a single CAG ID.

Further, the UE (100) performs a resume procedure on the CAG cell and sends the CAG ID of the cell during the Resume procedure in the RRC message. For example, the UE (100) sends the CAG ID of the CAG cell in the RRCResumeRequest message or an RRCResumeComplete message or in a new RRC message or in an existing RRC message for NR. For ng-eNB, the UE (100) sends CAG ID for the CAG cell in the RRCConnectionResume message or RRCConnectionResumeComplete message.

At step 2a, the UE (100) sends the RRCResumeRequest message including the CAG ID to the NG-RAN (200). Based on the RRCResumeRequest, the NG-RAN (200) sends the RRCResume message to the UE (100) at step 2b. At step 2c, the UE (100) sends the RRCResumeComplete message including the CAG ID and the NAS message. In an example embodiment, the NAS message is optional.

At step 3: The NG-RAN (200) forwards the received CAG ID to the AMG (300) in an existing N1AP message or in a new N1AP message.

At step 4: The AMF (300a) checks whether the UE (100) has a valid subscription for the CAG ID. If the UE (100) has a valid subscription for the CAG ID, then the network keeps the UE (100) in the 5GMM-CONNECTED mode at step 5a. If the UE subscription for the CAG identifier has expired, then the AMF (300a) sends an existing NAS message or a new NAS message indicating to the UE (100) that the subscription of the CAG cell subscription corresponding the CAG ID has expired at step 5b. After sending the NAS message, the network releases the N1 signalling connection.

In an example embodiment, when the CAG cell broadcasts multiple CAG IDs in the CAG cell belonging to the registered Public network integrated NPN and the UE (100) subscribes to multiple CAG IDs broadcasted in the CAG cell, i.e., the allowed CAG list stored in the UE (100) includes more than one of the CAG IDs broadcasted in the CAG cell. In step 1, when the UE (100) selects a second CAG ID and sends the second CAG ID in step 2. The UE and the network execute steps 1-3.

At step 4, the AMF (300a) determines if the UE (100) is subscribed for the CAG ID.

At step 5a, if the UE (100) has a valid subscription for the CAG ID, then the AMF (300a) continues with the NAS procedure or keeps the UE (100) is 5GMM-CONNECTED state.

At step 5b, the AMF (300a) sends a NAS message (CAG ID is not subscribed or a CAG allowed list) if the UE does not have a valid subscription for the CAG ID.

Figure 12:
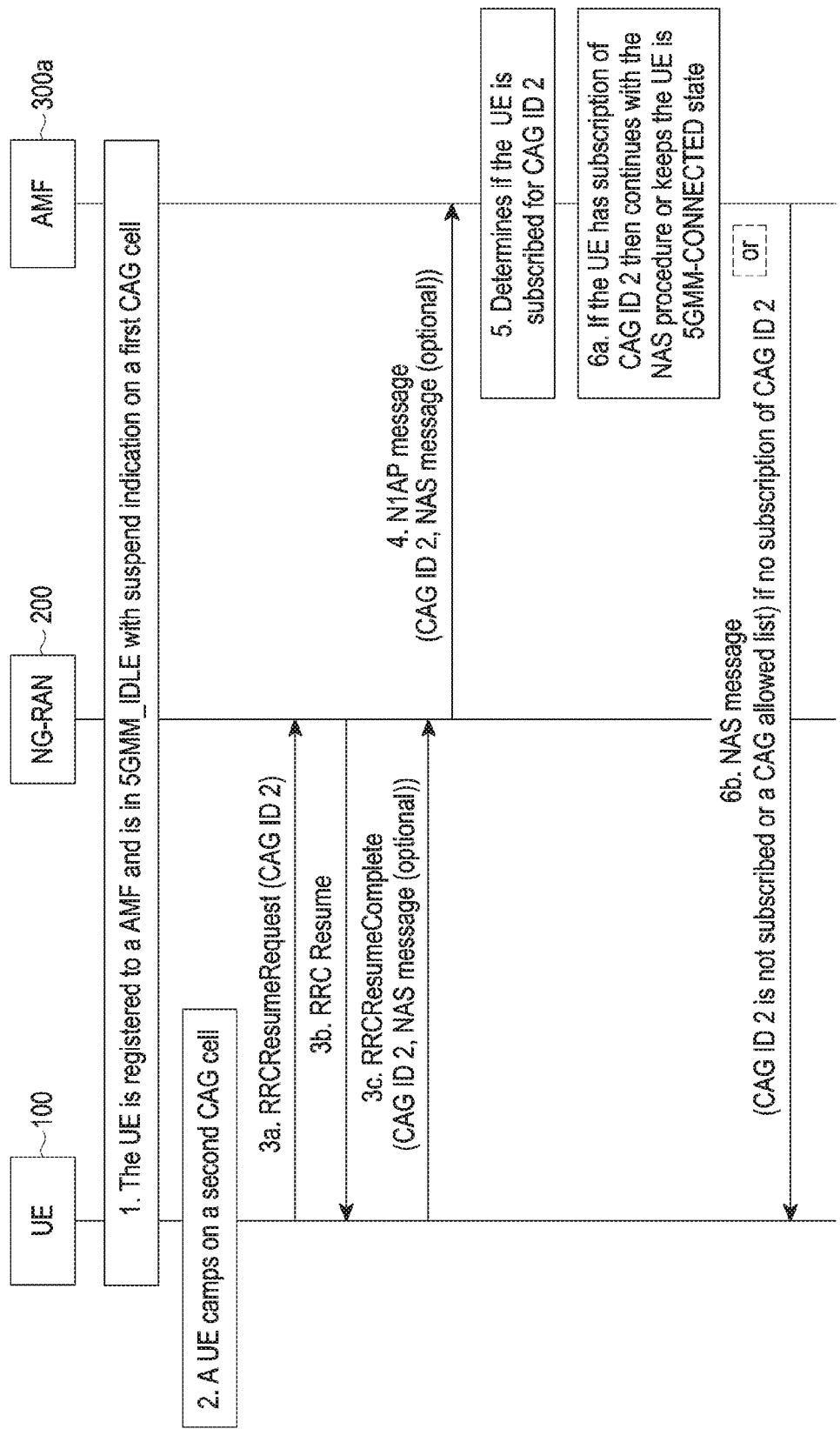
FIG. 12 is a sequence flow diagram illustrating another alternative method for transmission of CAG identifier during the resume procedure, according to an example embodiment as disclosed herein.

FIG. 12 is a sequence flow diagram illustrating another alternative example embodiment for transmission of CAG identifier during the resume procedure, according to an example embodiment as disclosed herein.

At Step 1: The UE (100) is camped on the first CAG cell, which broadcasts CAG identifier 1, and is registered to a registered Public network integrated NPN. The UE (100) has a valid subscription for the first CAG cell and a second CAG cell, i.e., the UE's allowed CAG lists have entrie for CAG identifier 1 and CAG identifier 2. The UE (100) is in the 5GMM-IDLE mode with suspend indication. In one example, the CAG identifier 1 and CAG identifier 2 belong to the registered Public network integrated NPN.

Step 2: The UE (100) selects a second CAG cell, which broadcasts the CAG identifier 2 but does not broadcast the CAG identifier 1. The second CAG cell may broadcast a CAG identifier other than CAG identifiers 1 and 2.

At Steps 3a-3c: The UE (100) performs the resume procedure on the CAG cell upon receiving the request from an upper layer. The UE (100) selects the second CAG identifier 2 and sends the CAG identifier 2 during the Resume procedure in the RRC message. In an example, the UE (100) sends the CAG ID of the CAG cell in the RRCResumeRequest or the RRCResumeComplete message or in the new RRC message or in the existing RRC message for the NR. For ng-eNB, the UE (100) sends the CAG ID for the CAG cell in the RRCConnectionResume message or RRCConnectionResumeComplete message.

At Step 4: The NG-RAN (200) forwards the received CAG identifier 2 to the AMF (300a) in an existing N1AP message or in a new N1AP message.

At Step 5: The AMF (300a) checks whether the UE (100) has a valid subscription for the CAG identifier 2 or not.

At step 6a, if the UE (100) has a valid subscription for the CAG identifier 2, then the AMF (300a) keeps the UE (100) in the 5GMM-CONNECTED mode. If the UE subscription for the CAG identifier 2 has expired, then the AMF (300a) sends an existing NAS message or a new NAS message indicating to the UE (100) that the subscription of the CAG cell subscription corresponding the CAG identifier 2 has expired. After sending the NAS message, the network releases the N1 signalling connection at step 6b.

In an example, the first CAG cell and the second CAG Cell belong to the same registered area. In another example, the first CAG cell and the second CAG cell do not belong to the same registration area.

In an example, the NG-RAN (200) stores the CAG cell identifier 1 in step 1. In steps 3-4, when the NG-RAN (200) receives the CAG identifier and when the NG-RAN (200) receives the CAG identifier 2, the NG-RAN (200) determines that the CAG identifier 1 and the CAG identifier 2 are different and then executes one of the following steps:
1. The NG-RAN (200) rejects the RRC resume procedure and sends the RRC connection reject message.
2. The NG-RAN (200) sends the RRC connection setup message establishing the RRC connection and the UE (100) sends the RRC connection setup complete message containing the CAG identifier 2.

Figure 13:
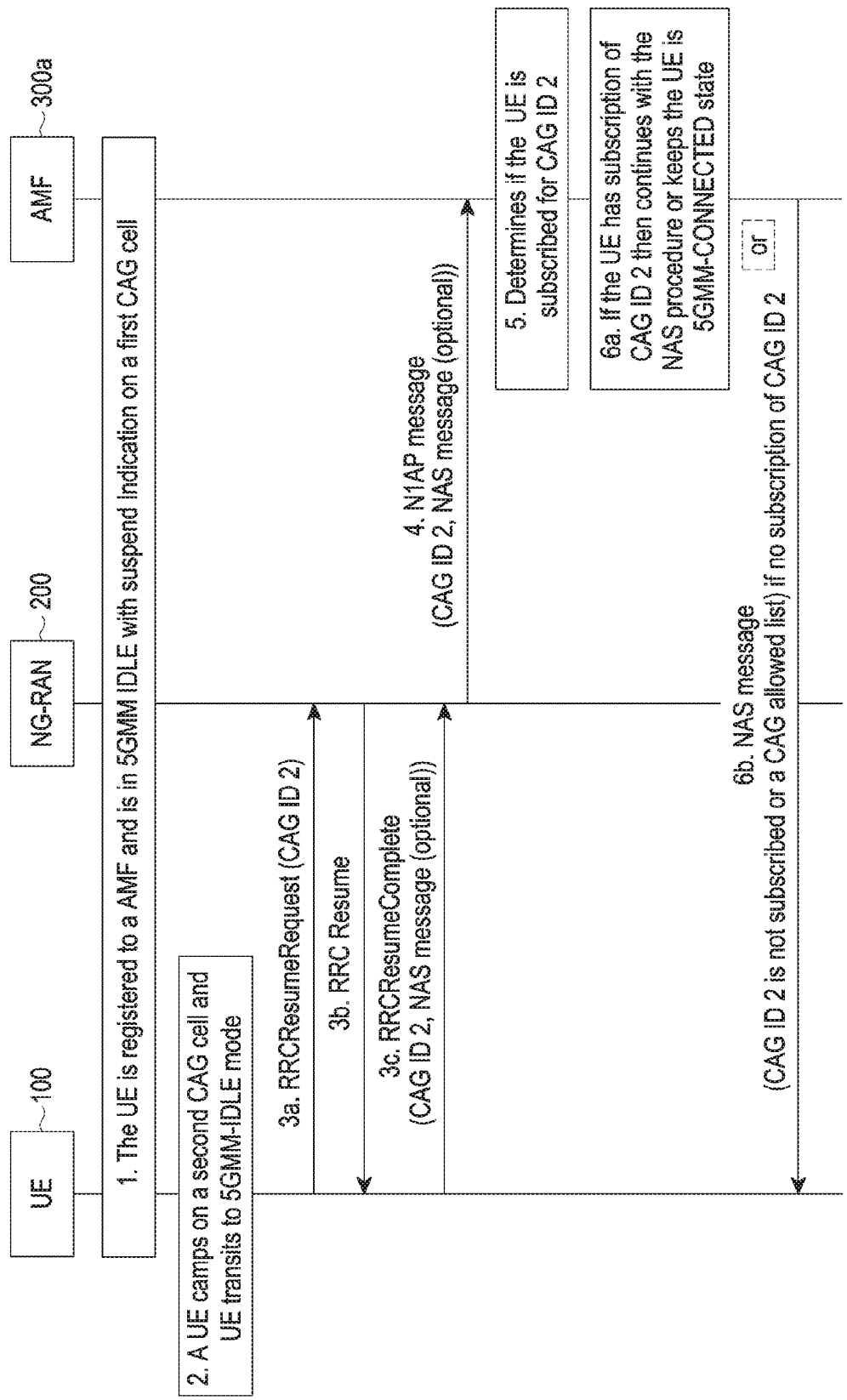
FIG. 13 is a sequence flow diagram illustrating another alternative method for transmission of CAG identifier during the resume procedure, according to an example embodiment as disclosed herein.

FIG. 13 is a sequence flow diagram illustrating another example of various operations for transmission of the CAG identifier during the resume procedure, according to an example embodiment as disclosed herein.

At Step 1: The UE (100) is camped on the first CAG cell, which broadcasts the CAG identifier 1, and is registered to the Public network integrated NPN. The UE (100) has a valid subscription for the first CAG cell and the second CAG cell, i.e., the UE allowed CAG lists have entries CAG identifier 1 and CAG identifier 2. The UE (100) is in the 5GMM-IDLE mode with suspend indication. In an example, the CAG identifier 1 and the CAG identifier 2 belong to the registered Public network integrated NPN.

At Step 2: The UE (100) selects the second CAG cell, which broadcasts CAG identifier 2 but does not broadcast the CAG identifier 1. The second CAG cell may broadcast the CAG identifier other than CAG identifier 1 and 2. The UE (100) transits from the 5GMM-CONNECTED state with the RRC inactive to the 5GMM-IDLE mode and releases the stored AS context.

At Step 3a-3c: The UE (100) establishes the RRC connection upon receiving the request from an upper layer (e.g., Non-Access Stratum, (NAS)). The UE (100) sends the CAG identifier 2 during the RRC connection establishment procedure (i.e., in the RRC setup complete message or the RRC connection setup complete message).

At Step 4: The NG-RAN (200) forwards the received CAG identifier 2 to the AMF (300a) in an existing N1AP message or in a new N1AP message.

At Step 5: The AMF (300a) checks whether the UE (100) has a valid subscription for the CAG identifier 2 or not. At 6a, if the UE (100) has a valid subscription for the CAG identifier 2, then the network (i.e., AMF (300a)) keeps the UE (100) in the 5GMM-CONNECTED mode. At Step 6b, if the UE subscription for the CAG identifier 2 has expired, then the AMF (300a) sends an existing NAS message or a new NAS message indicating to the UE (100) that the subscription of the CAG cell subscription corresponding the CAG identifier 2 has expired. After sending the NAS message, the network (i.e., AMF (300a)) releases the N1 signalling connection.

In one example, for the processes disclosed in FIG. 10-FIG. 13, the AMF (300a) provides the updated Allowed CAG list to the NG-RAN (200). When the NG-RAN (200) receives the CAG identifier during the resume procedure, the NG-RAN (200) determines if the CAG identifier received from the UE (100) is in the Allowed CAG list or not. If the received CAG ID is in the allowed List, then the NG-RAN (200) proceeds with the resume procedure. Otherwise, the NG-RAN (200) releases the RRC connection and sends an information element indicating to the UE (100) that the CAG identifier is not subscribed in an existing RRC message (e.g., RRCConnectionRelease or RRCConnectionReject) or a new RRC message. In an example, the information element is sent integrity protected. When the UE (100) receives the information element in the RRC message, the UE (100) removes the sent CAG identifier from the Allowed CAG list. In another example, the NG-RAN (200) sends the Allowed CAG list related to the UE (100) in an existing RRC message or existing RRC message. The UE (100), on receiving the Allowed CAG list, replaces the stored Allowed CAG list with the received Allowed CAG list from NG-RAN (200). In another example, the NG-RAN (200) includes the CAG identifier and also the information element indicating that the UE (100) is not subscribed to the CAG identifier.

Figure 14:
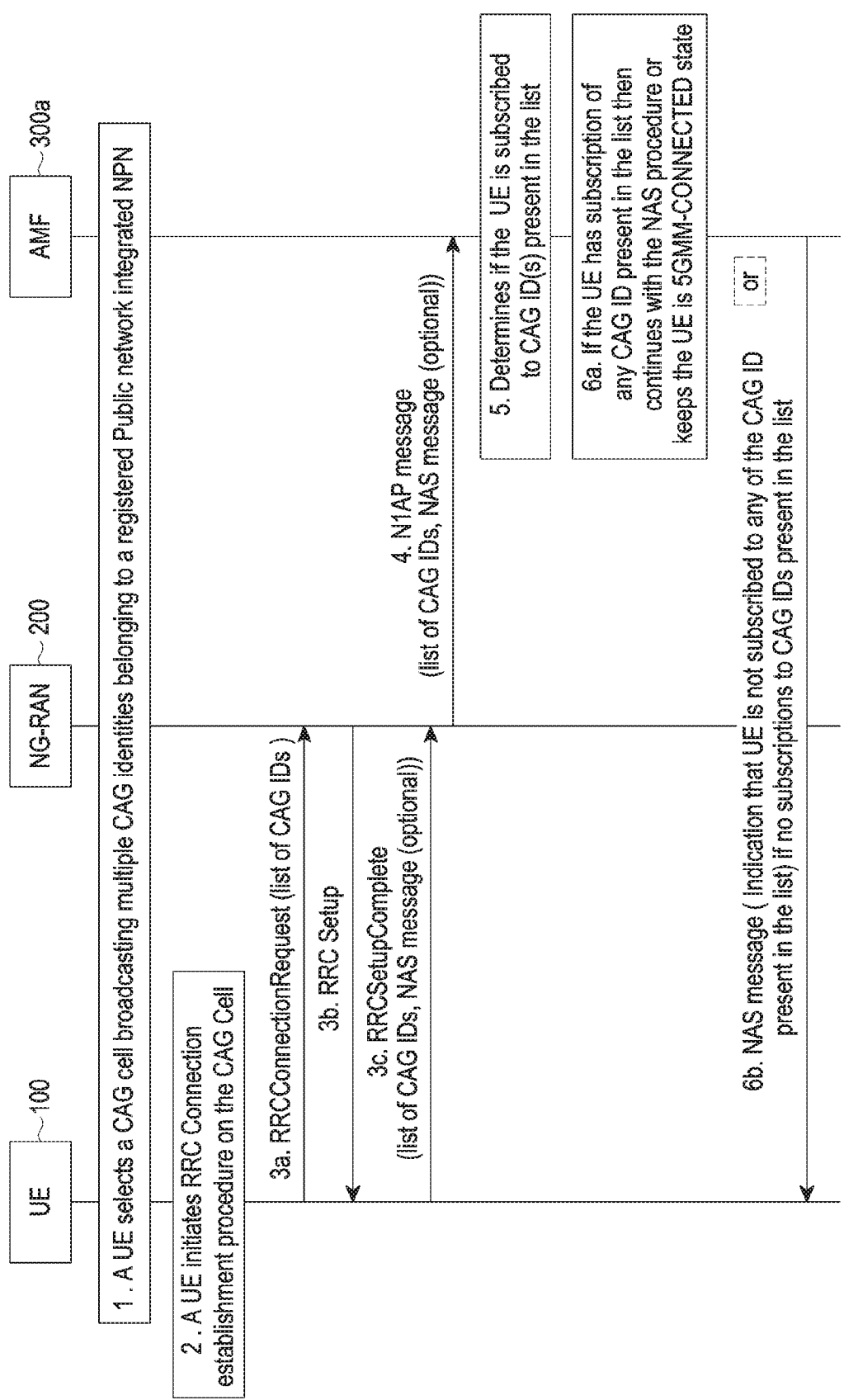
FIG. 14 is a sequence flow diagram illustrating another alternative method for transmission of CAG identifier during the resume procedure, according to an example embodiment as disclosed herein.

FIG. 14 is a sequence flow diagram illustrating other alternative example processes for transmission of the CAG identifier during the resume procedure, according to an example embodiment as disclosed herein.

At step 1: The UE (100) has an Allowed CAG list that includes more than one CAG identifier. The UE (100) camps on the CAG cell broadcasting more than one CAG identifiers of a same Public network integrated NPN. More than one broadcasted CAG identifiers are present in the Allowed CAG list.

At Step 2-step 3c: The UE (100) initiates the RRC connection establishment procedure and the UE (100) sends all broadcasted CAG identifiers which are present in the Allowed CAG list of the UE (100) during the RRC connection to the NG-RAN (200). The UE (100) sends the RRCConnectionRequest message including the list of CAG IDs to the NG-RAN (200) at step 3a. Based on the RRCConnectionRequest, the NG-RAN (200) sends the RRCSetup message to the UE (100) at step 3b. Based on the RRCSetup, the UE (100) sends the RRCSetupComplete message including the list of CAG IDs and NAS message to the NG-RAN (200) at step 3c. In an example embodiment, the NAS message is optional.

At Step 4: The NG-RAN (200) forwards all the received CAG identifiers from the UE (100) to the AMF (300a).

At Step 5: The AMF (300a) checks if the UE (100) has a valid subscription corresponding to the received CAG identifiers. The AMF (300a) executes either step 6a or 6b.

At Step 6a: If the AMF (300a) determines that the UE (100) has a valid subscription for at least one of the received CAG identifiers. then the AMF (300a) proceeds with the NAS procedure or keeps the UE (100) in the 5GMM-CONNECTED state.

At Step 6b: If the UE (100) has no valid subscription for any CSG identifiers, then the AMF (300a) informs the UE (100) that the UE (100) does not have a valid subscription for the received CAG identities. The AMF (300a) subsequently releases the NAS signalling connection.

In an example embodiment, the multiple broadcasted CAG identifiers of the registered Public network integrated NPN in the CAG cell which are also present in the UE Allowed CAG list are sent to the NG-RAN (200) during the resume procedure when the UE (100) is in the 5GMM-CONNECTED with the RRC inactive Indication or the 5GMM-IDLE mode with suspend indication (i.e., during the state transition from the 5GMM-CONNECTED with the RRC inactive state to the 5GMM-CONNECTED mode or the 5GMM-CONNECTED with suspend indication to the 5GMM CONNECTED mode). The NG-RAN (200) forwards these CAG identifiers to the AMF (300a). The AMF (300a) then executes step 5-6b.

Figure 15:
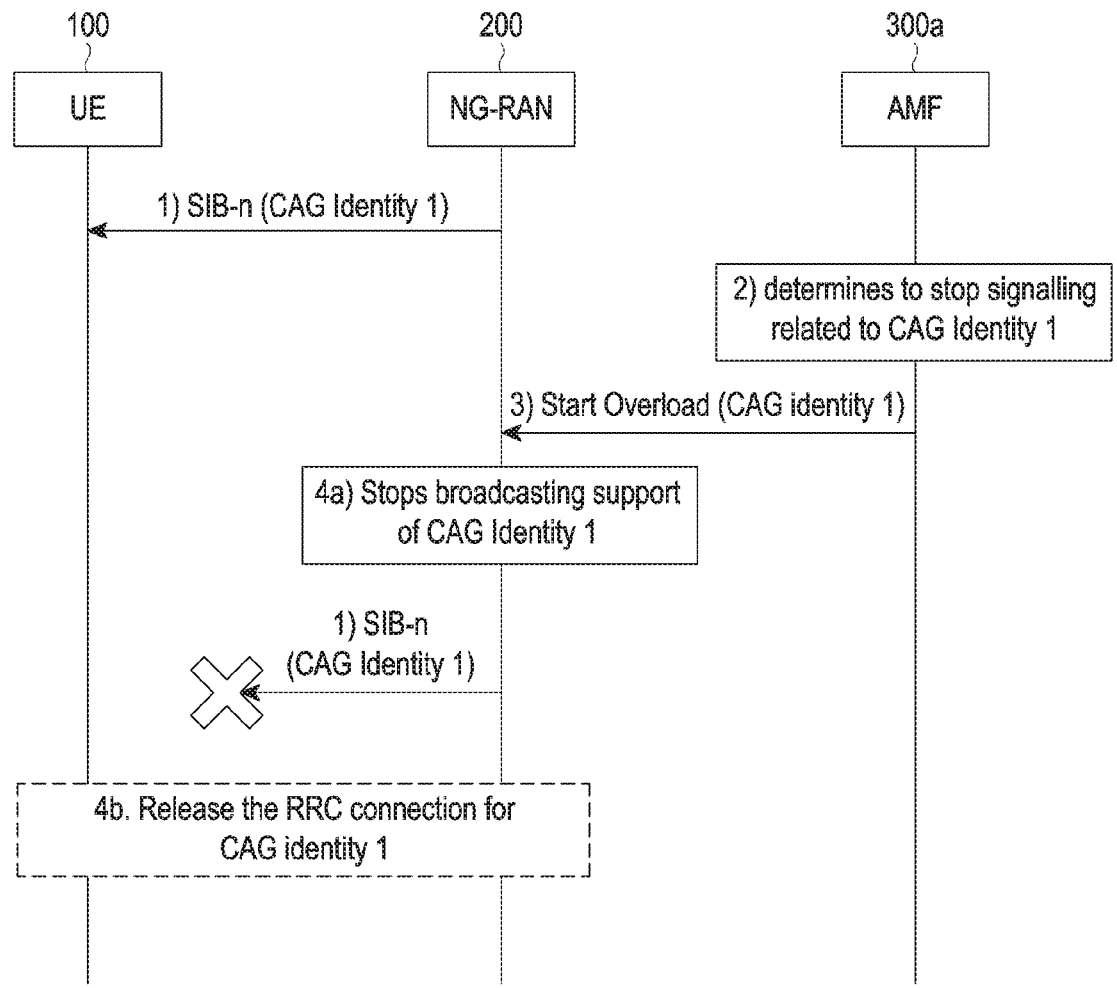
FIG. 15 is a sequence flow diagram illustrating a method for Handling of CAG ID final, according to an example embodiment as disclosed herein.

FIG. 15 is a sequence flow diagram illustrating various example procedures for handling of CAG ID final, according to an example embodiment as disclosed herein.

At step 1, the network (i.e., NG-RAN (200)) supports the CAG identifier (or identity) 1 and broadcasts the CAG identifier 1 related to the CAG 1 in a System Information Block (SIB).

At step 2, the AMF (300a) determines to stop signaling related to the CAG identifier 1 (e.g., due to overload situation in the AMF (300a) due to signaling storm related to the CAG identity 1).

At step 3, the AMF (300a) sends a NGAP message to the NG-RAN (200) (e.g., start overload) containing the CAG identifier 1 indicating the NG-RAN (200a) to stop signaling related to the CAG identifier 1. The AMF (300a) may not send this request to random NG-RAN(s) connected to the AMF (300a). In an example, the AMF (300a) sends this message to all NG-RANs (200) connected to the AMF (300a). The NG-RAN (200), on receiving the NGAP message, will either perform steps 4a-5a or 4b. At steps 4a-5a, the NG-RAN (200) stops broadcasting the CAG identity 1 in CAG cells operated by the NG-RAN (200). In an example embodiment, the NG-RAN (200a) stops broadcasting CAG Identifier 1 in some CAG cells operated by the NG-RAN (200a).

At step 4b, the NG-RAN (200a) starts rejecting or releasing the RRC connection establishment procedure related to the CAG identifier 1, (e.g., when the RRCsetupComplete message contains the CAG identity 1 then the NG-RAN (200) releases the RRC connection by sending RRCConnectionRelease message). In an example embodiment, the RRC connection release message may contain a wait time or a wait time and the CAG identifier 1. One receiving the RRC connection Release message, the UE (100) does not initiate a AS or NAS procedure related to the CAG identifier 1 during the wait time.

In an example embodiment, when the AMF (300a) receives a first NAS message related to the CAG identifier 1, then the AMF (300a) rejects the NAS procedure and sends a second NAS message containing a back off timer related to the CAG identifier 1 and indicates to the UE (100) not to initiate signalling related to the CAG Identifier 1. The UE (100a), on receiving the second NAS message, runs a back off timer and shall not initiates any AS or NAS procedure related to the CAG identifier 1 until the back off timer expires. In another example embodiment, the UE (100) still CAG cell broadcasting CAG identity 1 to select the CAG cell. In another embodiment, the UE (100) does not consider the CAG identifier 1 for cell selection/reselection procedure until the back off timer expires.

Figure 16A:
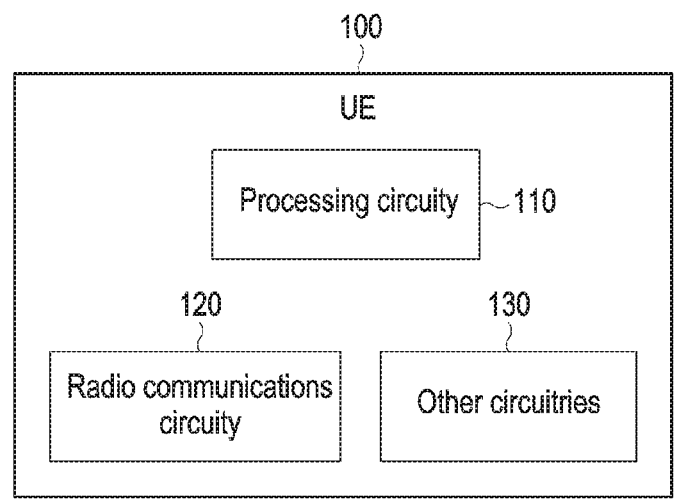
FIG. 16A shows various hardware components of a UE for handling the CAG related procedure in the wireless communication system, according to an example embodiment as disclosed herein.

FIG. 16A shows various hardware components of the UE (100) for handling the CAG related procedure in the wireless communication system, according to an example embodiment as disclosed herein. The UE (100) can be, for example but not limited to a cellular phone, a tablet, a smart phone, a laptop, a Personal Digital Assistant (PDA), a global positioning system, a multimedia device, a video device, an internet of things (IoT) device, a smart watch, a game console, a smart watch, a foldable display device, an Unmanned Aerial Vehicle (UAV), an airplane or the like. The UE (100) may also be referred to by those skilled in the art as a mobile station, a subscriber station, a mobile unit, a subscriber unit, a wireless unit, a remote unit, a mobile device, a wireless device, a wireless communications device, a mobile subscriber station, an access terminal, a mobile terminal, a wireless terminal, a remote terminal, a handset, a user agent, a mobile client, or the like.

In an example embodiment, the UE (100) includes processing circuitry (110), radio communications circuitry (120), and an other circuitry (130). The processing circuitry (110) is coupled with radio communications circuitry (120) and the other circuitry (130). The radio communications circuitry (120) may be referred to as interface circuitry. The processing circuitry (110) may include a CAG identifier protection engine. The processing circuitry (110) is configured to execute instructions stored in the other circuitry (130) and to perform various processes. The radio communications circuitry (120) is configured for communicating internally between internal hardware components and with external devices via one or more networks.

The other circuitry (130) may include a memory. The memory stores instructions to be executed by the processing circuitry (110). The memory may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory may, in some examples, be considered a non-transitory storage medium. The term "non-transitory" may indicate that the storage medium is not embodied in a carrier wave or a propagated signal. However, the term "non-transitory" should not be interpreted that the memory is non-movable. In some examples, the memory can be configured to store larger amounts of information than the memory. In certain examples, a non-transitory storage medium may store data that can, over time, change (e.g., in Random Access Memory (RAM) or cache).

In an example embodiment, a CAG identifier protection engine included in the processing circuitry 110 is configured to trigger an initial registration procedure with at least one of the AMF entity (300a) and a SEAF entity (300b). Further, the CAG identifier protection engine is configured to detect that the UE (100) does not have a valid NAS security context and protect the CAG ID based on the detection during the initial registration procedure. In an example embodiment, the CAG ID is protected in the SUCI.

The CAG identifier protection engine is further configured to send the registration request message comprising the SUCI having the protected CAG ID to at least one of the AMF entity (300a) and the SEAF entity (300b).

In another embodiment, the CAG identifier protection engine is configured to detect that the UE (100) does not have a valid NAS security context. The CAG identifier protection engine is further configured to send an initial NAS message with a clear text IE, wherein the UE (100) does not include a first information element in the initial NAS message. The first IE is a CAG identifier. The CAG identifier protection engine is further configured to create a NAS security context. The NAS security context is created by performing the authentication procedure between the UE (100) and an AMF (300a), receiving the security mode command based on the authentication procedure, and creating the NAS security context based on the received security mode command. The CAG identifier protection engine is further configured to transmit a security mode complete NAS message including a complete initial NAS message. The security mode complete NAS message is ciphered with the NAS security context. The security mode complete NAS message comprises the first IE.

In an example embodiment, the CAG ID is protected in the SUCI by protecting the CAG ID with the SUPI into the SUCI.

In an example embodiment, the CAG identifier protection engine sends the registration request message comprising the protected CAG ID as the access network parameter to at least one of the AMF entity (300a) and the SEAF entity (300b).

In an example embodiment, the CAG identifier protection engine is further configured to indicate whether the protected CAG ID is present in a SUCI to at least one of an AMF entity (300a) and a SEAF entity (300b).

In another example embodiment, the CAG identifier protection engine is configured to trigger the initial registration procedure with at least one of the AMF entity (300a) and the SEAF entity. The CAG identifier protection engine is further configured to detect that the UE (100) does not have a valid NAS security context, while triggering the initial registration procedure and send an initial NAS message with a clear text IE. The UE (100) does not include a first IE in the initial NAS message. The first IE can be a CAG identifier and low access priority indicator. The CAG identifier protection engine is further configured to create a NAS security context and transmit a security mode complete NAS message including a complete initial NAS message. The security mode complete NAS message is ciphered with the NAS security context. The NAS security context is created by performing an authentication procedure between the UE (100) and the AMF (300a), receiving a security mode command based on the authentication procedure, and creating the NAS security context based on the received security mode command.

In an example embodiment, the security mode complete NAS message comprises the first IE.

In an example embodiment, the CAG identifier protection engine is configured to receive an information element indicating to the UE (100) that at least one CAG ID is not subscribed in the RRC message. The information element is received from the NG-RAN (200). Further, the CAG identifier protection engine is configured to perform one of: remove the at least one CAG ID from an allowed CAG list based on the received information element, and replace a stored Allowed CAG list with new received allowed CAG list from the NG-RAN based on the received information element.

Although the FIG. 16A shows various hardware components of the UE (100) but it is to be understood that other example embodiments are not limited thereto. In other example embodiments, the UE (100) may include less or more components. Further, the labels or names of the components are used only for illustrative purposes. One or more components can be combined together to perform the same or substantially similar function to handle the CAG related procedures in the wireless communication system.

Figure 16B:
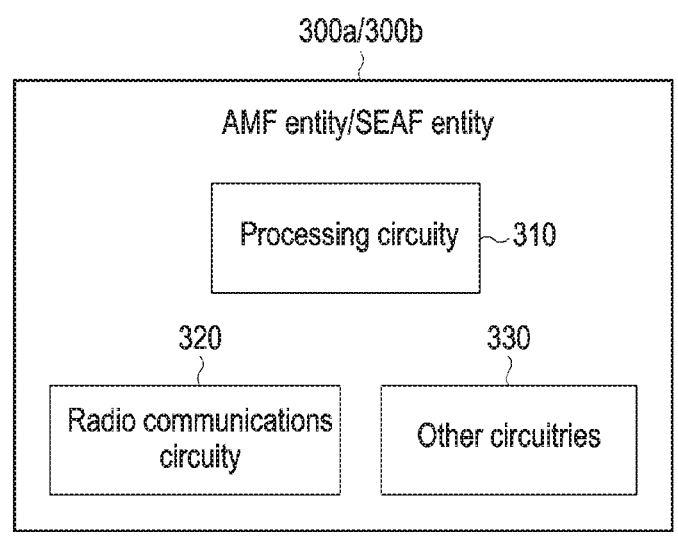
FIG. 16B shows various hardware components of an AMF entity and a SEAF entity for handling the CAG related procedure in a wireless communication system, according to an example embodiment as disclosed herein.

FIG. 16B shows various hardware components of the AMF entity (300a) and the SEAF entity (300b) for handling the CAG related procedure in the wireless communication system, according to an example embodiment as disclosed herein. The AMF entity (300a) and the SEAF entity (300b) include processing circuitry (310), radio communications circuitry (320), and other circuitries (330). The processing circuitry (310) is coupled with the other circuitries (330) and the radio communications circuitry (320). The radio communications circuitry (320) may be referred to as an interface circuitry. The processing circuitry (310) may include a CAG identifier protection engine. The processing circuitry (310) is configured to execute instructions stored in the other circuitries (330) and to perform various processes. The radio communications circuitry (320) is configured for communicating internally between internal hardware components and with external devices via one or more networks.

The processing circuitry (310) is configured to receive the registration request message comprising the SUCI having the protected CAG ID from the UE (100). The processing circuitry (310) is further configured to send the authenticate request message to the AUSF entity (500) based on the registration request message. The authenticate request message includes the SUCI having the protected CAG ID. The processing circuitry (310) is further configured to initiate the primary authentication procedure based on the authenticate request message.

Although the FIG. 16B shows various hardware components of the AMF entity (300a) or the SEAF entity (300b) but it is to be understood that other example embodiments are not limited thereto. In other example embodiments, the AMF entity (300a) or the SEAF entity (300b) may include less or more components. Further, the labels or names of the components are used only for illustrative purposes. One or more components can be combined together to perform the same or substantially similar function to handle the CAG related procedures in the wireless communication system.

Figure 16C:
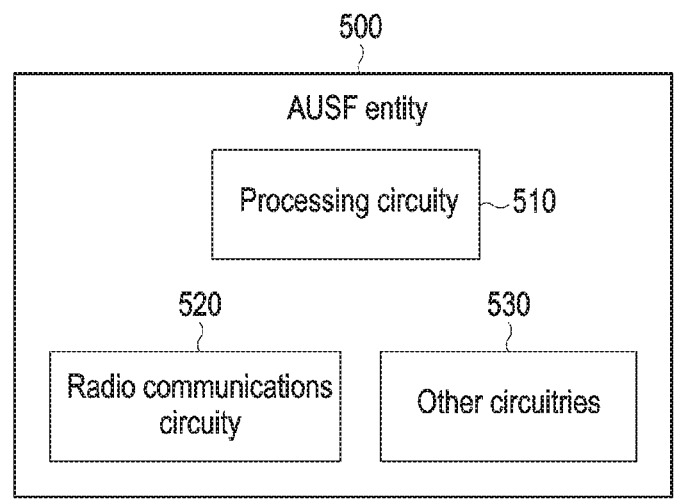
FIG. 16C shows various hardware components of an AUSF entity for handling the CAG related procedure in the wireless communication system, according to an example embodiment as disclosed herein.

FIG. 16C shows various hardware components of the AUSF entity (500) for handling the CAG related procedure in the wireless communication system, according to an example embodiment as disclosed herein. The AUSF entity (500) includes processing circuitry (510), radio communications circuitry (520), and other circuitries (530). The radio communications circuitry (520) may be referred to as an interface circuitry. The processing circuitry (510) is coupled with the other circuitries (530) and the radio communications circuitry (520). The radio communications circuitry (520) may be referred to as interface circuitry. The processing circuitry (510) may include a CAG identifier protection engine. The processing circuitry (510) is configured to execute instructions stored in the memory and to perform various processes. The radio communications circuitry (520) is configured for communicating internally between internal hardware components and with external devices via one or more networks.

The processing circuitry (510) is configured to receive the authenticate request message from one of the AMF entity (300a) and the SEAF entity (300b). The authenticate request message comprises the SUCI having the protected CAG ID. The processing circuitry (510) is further configured to determine that the authenticate request message comprises the SUCI having the protected CAG ID. The processing circuitry (510) is further configured to send the authentication get request message to the UDM (400a) based on the determination. The processing circuitry (510) is further configured to receive the authentication get response message from the UDM (400a), based on the authentication get request message, by de-concealing the SUCI to the SUPI and the CAG ID using the UDM (400a). The authentication get response message comprises de-concealed CAG ID with SUPI. The processing circuitry (510) is further configured to share the authentication get response message from the UDM (400a) to at least one of the AMF (300a) and the SEAF (300b).

FIG. 16C may also be used for other 5G core network apparatus which include one of 5G core network entities (e.g., UDM, ARPF or SIDF).

Figure 16D:
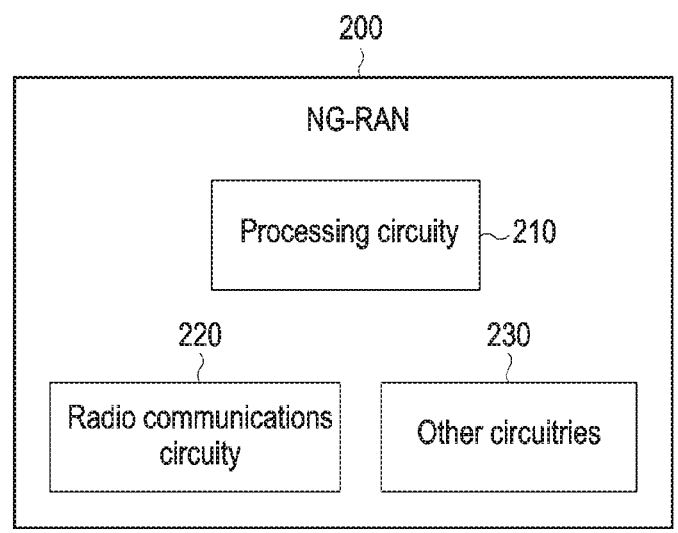
FIG. 16D shows various hardware components of a base station (i.e., NG-RAN) for handling the CAG related procedure in the wireless communication system, according to an example embodiment as disclosed herein.

FIG. 16D shows various hardware components of a base station (i.e., NG-RAN or network) (200) for handling CAG related procedures in the wireless communication system, according to an example embodiment as disclosed herein. In an example embodiment, the NG-RAN (200) includes processing circuitry (210), radio communications circuitry (220), and other circuitries (230). The radio communications circuitry (220) may be referred to as an interface circuitry. The processing circuitry (210) is coupled with the other circuitries (230) and the radio communications circuitry (220). The processing circuitry (210) may include a CAG identifier protection engine. The processing circuitry (210) is configured to execute instructions stored in the memory and to perform various processes. The radio communications circuitry (220) is configured for communicating internally between internal hardware components and with external devices via one or more networks.

The other circuitries (230) may include a memory.

The memory stores instructions to be executed by the processing circuitry (210). The memory may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory may, in some examples, be considered a non-transitory storage medium. The term "non-transitory" may indicate that the storage medium is not embodied in a carrier wave or a propagated signal. However, the term "non-transitory" should not be interpreted that the memory is non-movable. In some examples, the memory can be configured to store larger amounts of information than the memory. In certain examples, a non-transitory storage medium may store data that can, over time, change (e.g., in Random Access Memory (RAM) or cache).

In an example embodiment, the CAG identifier protection engine is configured to receive the RRC resume request message when the UE (100) initiates the RRC resume procedure for the RRC inactive state to the RRC connected state transition in the CAG cell. In an example embodiment, the at least one CAG identifier in the allowed CAG list is determined based on mobility restrictions received from an AMF entity (300a).

The mobility restrictions correspond to mobility related subscription information of the UE (100). The mobility related subscription information determines the cells or tracking areas where the UE (100) can get service. The mobility related subscription information consists of RAT restriction, Forbidden Area, Service Area Restrictions, Core Network type restriction and Closed Access Group information.

Further, the CAG identifier protection engine is configured to determine whether the at least one CAG identifier broadcasted in the CAG cell is in the allowed CAG list. If the at least one CAG ID is in the allowed CAG list, the CAG identifier protection engine is configured to proceed with the RRC resume procedure. If the at least one CAG ID is not in the allowed CAG list, the CAG identifier protection engine is configured to release the RRC connection by sending a RRC message if the at least one CAG ID broadcasted by the CAG cell is not included in the CAG allowed list. Further, the CAG identifier protection engine is configured to send the information element indicating to the UE that the at least one CAG identifier is not subscribed in a RRC message based on the released RRC connection. In an example embodiment, the RRC message is at least one of a RRC connection release message and a RRC connection reject message. In an example embodiment, the information element is sent in an integrity protected.

Although the FIG. 16D shows various hardware components of the NG-RAN (200) but it is to be understood that other example embodiments are not limited thereto. In other example embodiments, the NG-RAN (200) may include less or more components. Further, the labels or names of the components are used only for illustrative purposes. One or more components can be combined together to perform the same or substantially similar function to handle the CAG related procedures in the wireless communication system.

Figure 17A:
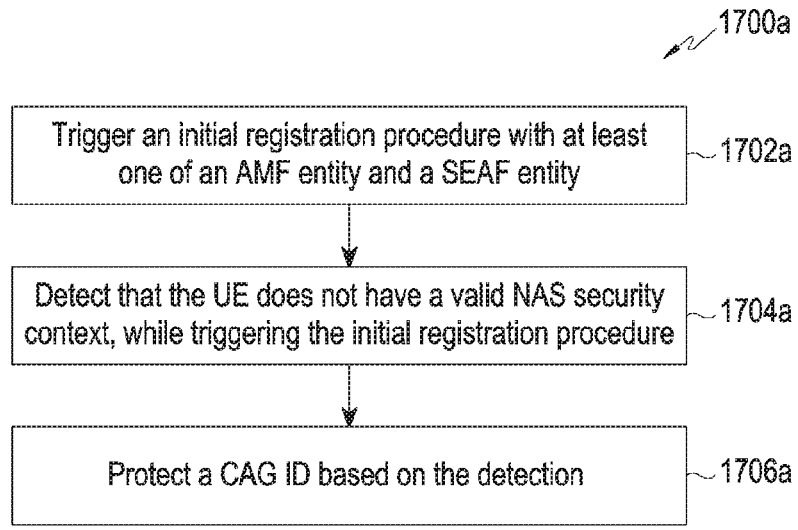
FIG. 17A is a flow chart illustrating a method, implemented by the UE, for handling the CAG related procedure in the wireless communication system, according to an example embodiment as disclosed herein.

FIG. 17A is a flow chart (1700a) illustrating a method, implemented by the UE (100), for handling CAG related procedures in the wireless communication system (1000), according to an example embodiment as disclosed herein. The operations (1702a and 1706a) are performed by the processing circuitry 110. The UE may trigger the initial registration procedure with at least one of the AMF entity (300a) and the SEAF entity (300b) (step 1702a). The UE may detect that the UE (100) does not have a valid NAS security context, while triggering the initial registration procedure (step 1704a). The UE may protect the CAG ID based on the detection during the initial registration procedure (step 1706a).

Figure 17B:
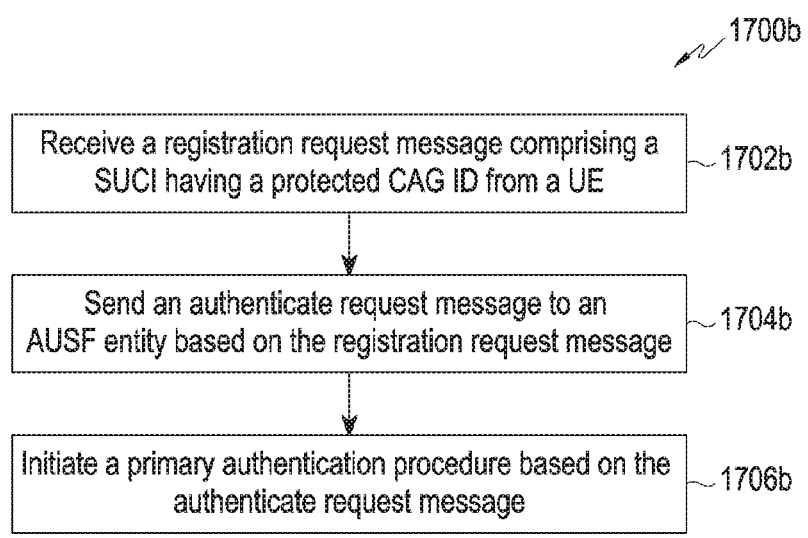
FIG. 17B is a flow chart illustrating a method, implemented by the AMF entity or the SEAF entity, for handling the CAG related procedure in the wireless communication system, according to an example embodiment as disclosed herein.

FIG. 17B is a flow chart (1700b) illustrating a method, implemented by the AMF entity (300a) or the SEAF entity (300b), for handling CAG related procedures in the wireless communication system, according to an example embodiment as disclosed herein. The operations (1702b to 1706b) are performed by the processing circuitry 310A. The AMF entity (300a) or the SEAF entity (300b) may receive the registration request message comprising the SUCI having the protected CAG ID from the UE (100) (step 1702b). The AMF entity (300a) or the SEAF entity (300b) may send the authenticate request message to the AUSF entity (500) based on the registration request message (step 1704b). The authenticate request message comprises the SUCI having the protected CAG ID. The AMF entity (300a) or the SEAF entity (300b) may initiate the primary authentication procedure based on the authenticate request message (step 1706b).

Figure 17C:
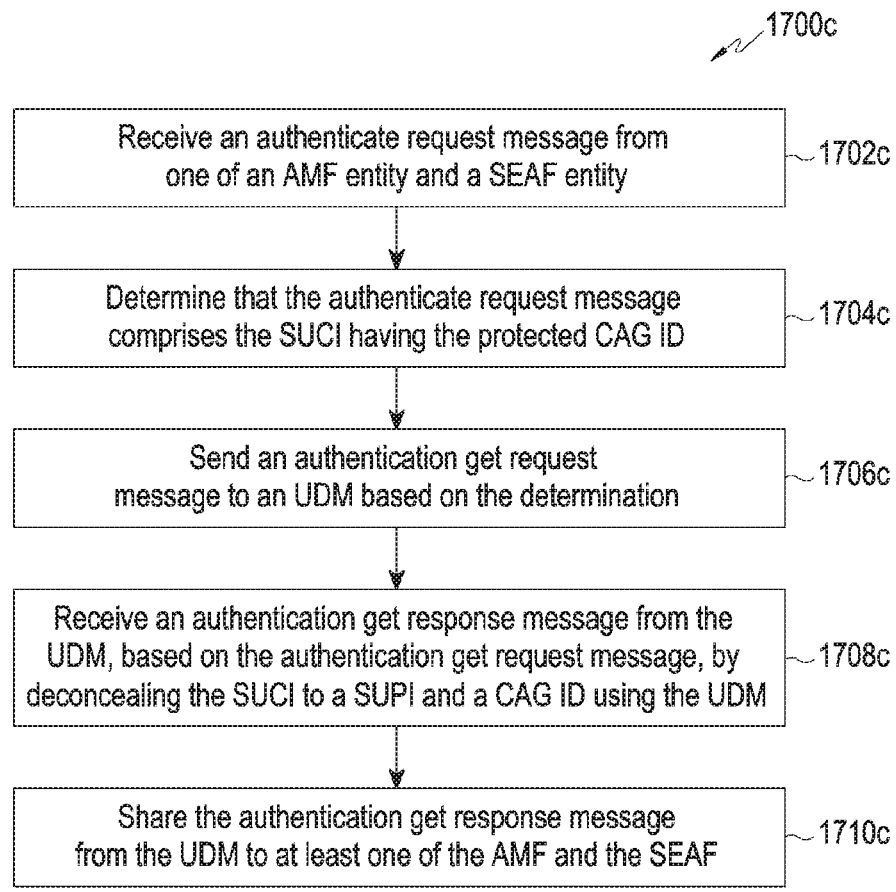
FIG. 17C is a flow chart illustrating a method, implemented by the AUSF entity, for handling the CAG related procedure in the wireless communication system, according to an example embodiment as disclosed herein.

FIG. 17C is a flow chart (1700c) illustrating a method, implemented by the AUSF entity (500), for handling CAG related procedures in the wireless communication system, according to an example embodiment as disclosed herein. The operations (1702c to 1710c) are performed by the processing circuitry 510. The AUSF entity (500) may receive the authenticate request message from one of the AMF entity (300a) and the SEAF entity (300b) (step 1702c). The authenticate request message includes the SUCI having the protected CAG ID. The AUSF entity (500) may determine that the authenticate request message comprises the SUCI having the protected CAG ID (step 1704c). The AUSF entity (500) may send the authentication get request message to the UDM (400a) based on the determination (step 1706c). The AUSF entity (500) receives an authentication get response message from the UDM (400a), based on the authentication get request message, by de-concealing the SUCI to the SUPI and the CAG ID using the UDM (400a) (step 1708c). The authentication get response message comprises the de-concealed CAG ID with SUPI. The AUSF entity (500) may share the authentication get response message from the UDM to at least one of the AMF (300a) and the SEAF (300b) (step 1710c).

Figure 17D:
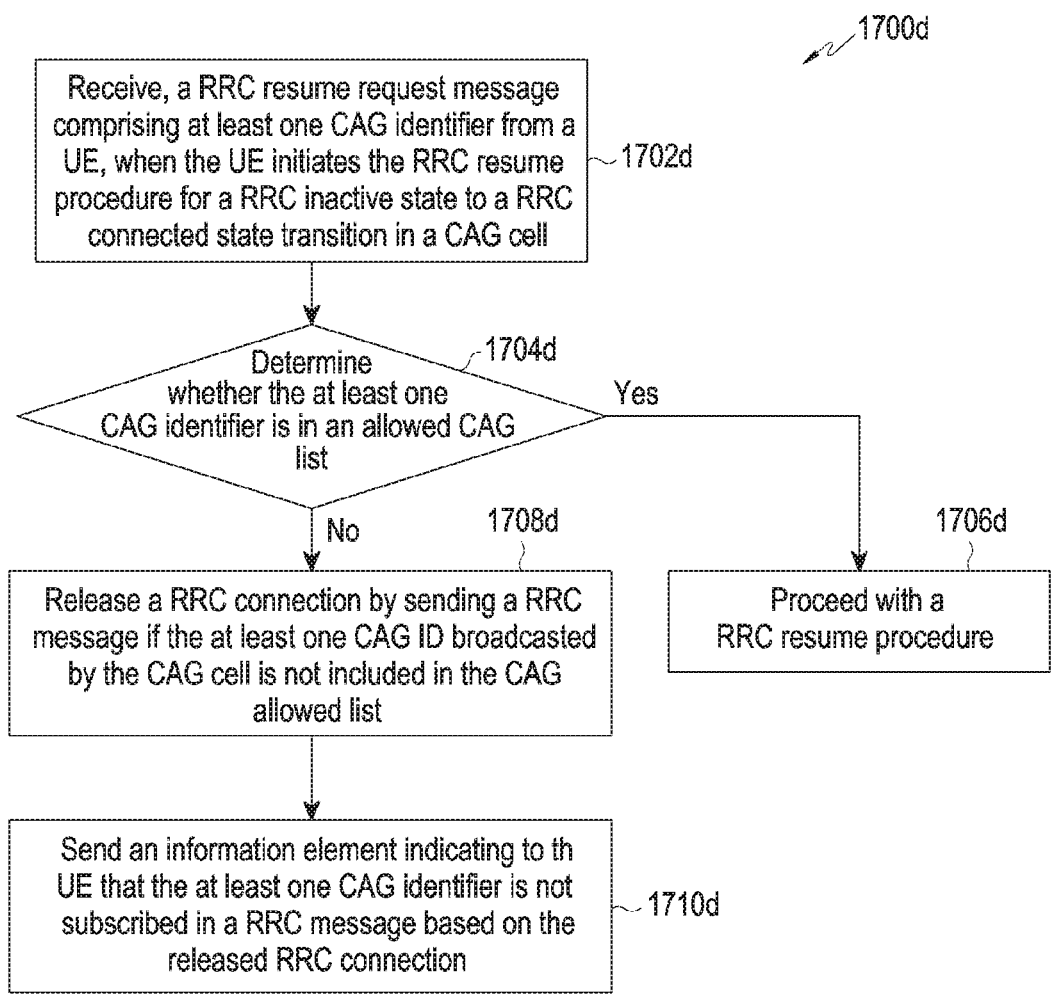
FIG. 17D is a flow chart illustrating a method for handling the CAG related procedure in the wireless communication system, according to an example embodiment as disclosed herein.

FIG. 17D is a flow chart (1700d) illustrating a method for handling the CAG related procedure in the wireless communication system, according to an example embodiment as disclosed herein. The operations (1702d and 1710d) are performed by the processing circuitry (210).

At 1702d, the method includes receiving the RRC resume request message, when the UE initiates the RRC resume procedure for the RRC inactive state to the RRC connected state transition in the CAG cell. At 1704d, the method includes determining whether the at least one CAG identifier broadcasted in the CAG cell is in the allowed CAG list of the UE (100). If the at least one CAG ID is in the allowed CAG list then, at 1706d, the method includes proceeding with the RRC resume procedure. If the at least one CAG ID is not in the allowed CAG list, then, at 1708d, the method includes releasing the RRC connection by sending a RRC message. At 1710d, the method further includes sending the information element indicating to the UE (100) that the at least one CAG identifier is not subscribed in the RRC message based on the released RRC connection. In 1710d, the method further includes sending allowed CAG list related to the UE in the RRC message based on the released RRC connection.

Figure 17E:
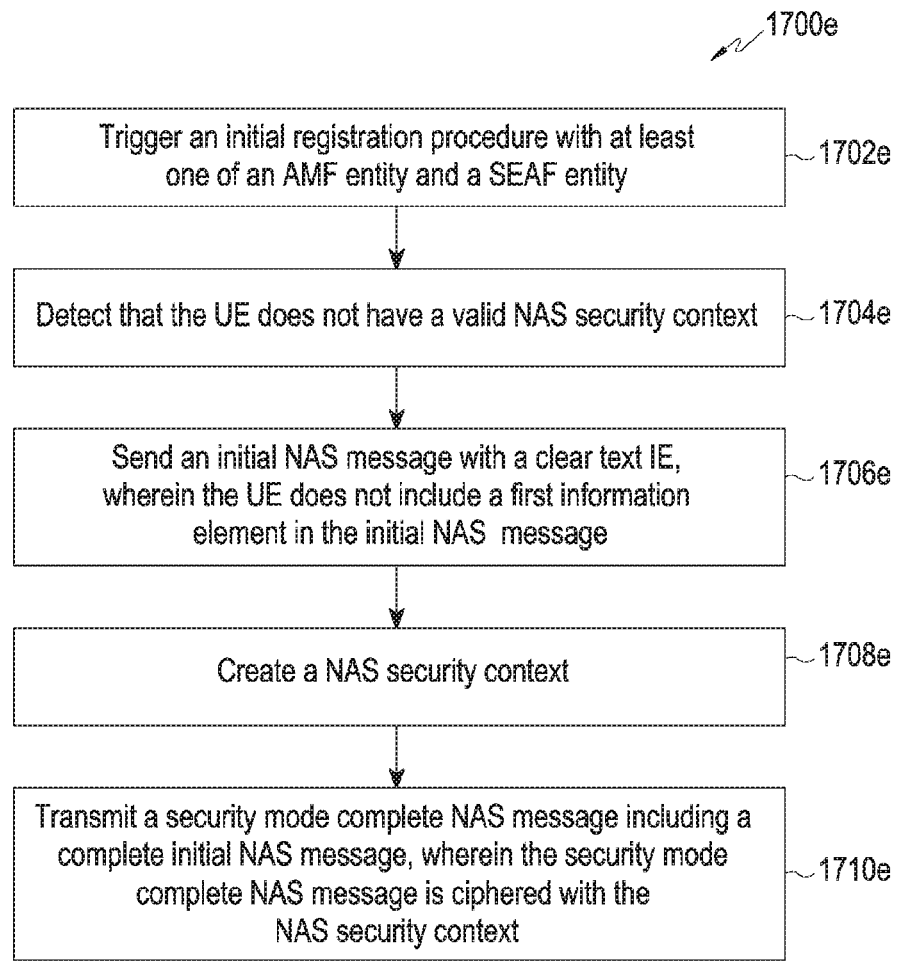
FIG. 17E is a flow chart illustrating a method, implemented by the UE, for handling the CAG related procedure in the wireless communication system, according to an example embodiment as disclosed herein.

FIG. 17E is a flow chart (1700e) illustrating a method, implemented by the UE (100), for handling CAG related procedures in the wireless communication system (1000), according to an example embodiment as disclosed herein. The operations (1702e and 1708e) are performed by the processing circuitry (110).

The UE may trigger the initial registration procedure with at least one of the AMF entity (300a) and the SEAF entity (300b) (step 1702e). The UE may detect that the UE (100) does not have the valid NAS security context (step 1704e). The UE may send the initial NAS message with the clear text IE, where the UE (100) does not include the first IE in the initial NAS message (step 1706e). The UE may create the NAS security context (step 1708e). The UE may transmit the security mode complete NAS message including the complete initial NAS message (step 1710e). The security mode complete NAS message is ciphered with the NAS security context.

Figure 18A:
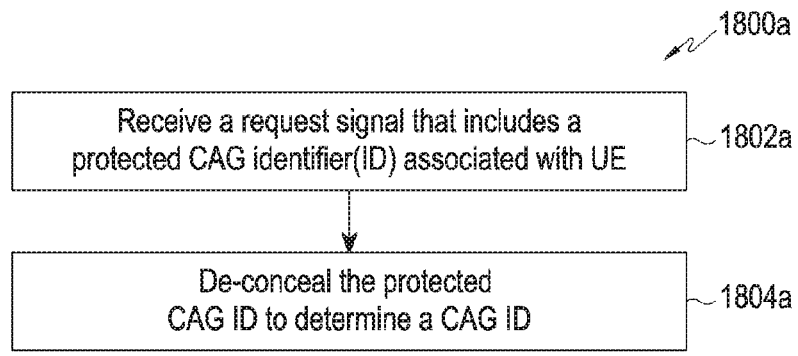
FIG. 18A is a flow chart illustrating a method, implemented by the core network apparatus, for supporting a UE accessing one or more closed access group (CAG) cells via a radio access network, according to an example embodiment as disclosed herein.

FIG. 18A is a flow chart illustrating a method, implemented by the core network apparatus, for supporting the UE (200) accessing one or more closed access group (CAG) cells via a radio access network, according to an example embodiment as disclosed herein. The operations are performed by the processing circuitry.

The core network apparatus may receive via the interface circuitry a request signal that includes a protected CAG identifier (ID) associated with the UE (step 1802a). The protected CAG ID may be useable to request access for the UE to the CAG cell. The core network apparatus may de-conceal the protected CAG ID to determine a CAG ID (step 1804a). The protected CAG ID includes the CAG ID.

Figure 18B:
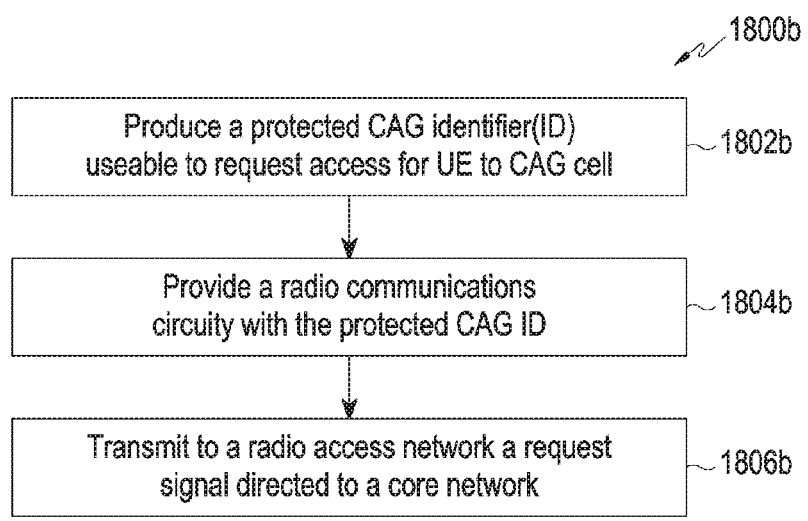
FIG. 18B is a flow chart illustrating a method, implemented by the UE, for accessing one or more CAG cells, according to an example embodiment as disclosed herein.

FIG. 18B is a flow chart illustrating a method, implemented by the UE (200) for accessing one or more closed access group (CAG) cells, according to an example embodiment as disclosed herein. The operations are performed by the processing circuitry (210).

The UE (200) may produce a protected CAG identifier (ID) useable to request access for the UE to the CAG cell (step 1802b). The UE may provide the radio communications circuitry with the protected CAG ID (step 1804b). The UE may transmit to a radio access network a request signal directed to a core network (step 1806b). The request signal includes the protected CAG ID. The protected CAG ID includes a CAG ID.

Figure 18C:
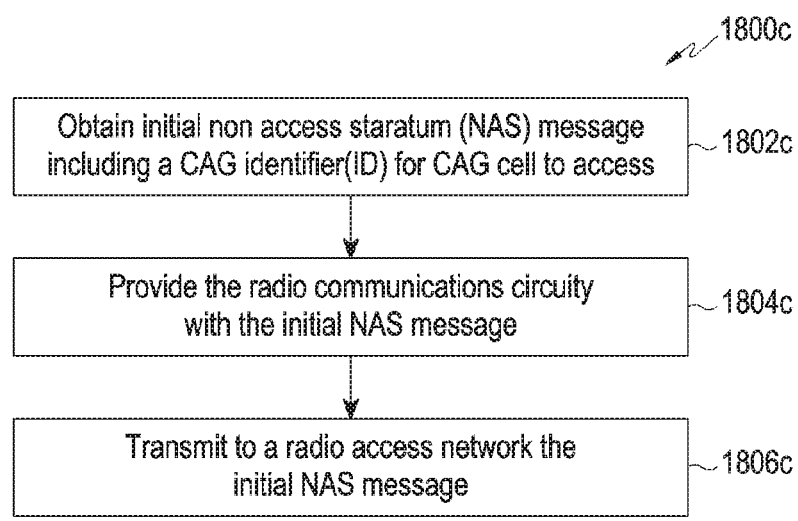
FIG. 18C is a flow chart illustrating a method, implemented by the UE, for accessing one or more CAG cells, according to an example embodiment as disclosed herein.

FIG. 18C is a flow chart illustrating a method, implemented by the UE (200) for accessing one or more closed access group (CAG) cells, according to an example embodiment as disclosed herein. The operations are performed by the processing circuitry (210).

The UE may obtain an initial non access staratum (NAS) message including a CAG identifier (ID) for a CAG cell to access (step 1802c). The CAG ID being protected by a scheme. The UE may provide the radio communications circuitry with the initial NAS message (step 1804c). The UE may transmit to a radio access network the initial NAS message (step 1806c).

The Example embodiments disclosed herein can be implemented using at least one software program running on at least one hardware device and performing network management functions to control the elements.

The various actions, acts, blocks, steps, or the like in the flow charts may be performed in the order presented, in a different order or simultaneously. Further, in some example embodiments, some of the actions, acts, blocks, steps, or the like may be omitted, added, modified, skipped, or the like without departing from the scope of the invention.

The foregoing description of the specific example embodiments will so fully reveal the general nature of the example embodiments herein that others can, by applying current knowledge, readily modify and/or adapt for various applications such specific example embodiments without departing from the generic concept, and, therefore, such adaptations and modifications should and are intended to be comprehended within the meaning and range of equivalents of the disclosed example embodiments. It is to be understood that the phraseology or terminology employed herein is for the purpose of description and not of limitation. Therefore, while the example embodiments herein have been described in terms of preferred example embodiments, those skilled in the art will recognize that the example embodiments herein can be practiced with modification within the spirit and scope of the example embodiments as described herein.

What is claimed is:

1. A core network apparatus for supporting a user equipment (UE) accessing one or more closed access group (CAG) cells via a radio access network, the core network apparatus comprising:
    interface circuitry to interface with the radio access network; and
    processing circuitry configured to:
        receive via the interface circuitry a request signal that includes a subscription concealed identifier (SUCI) and a protected CAG identifier (ID) associated with the UE, wherein the protected CAG ID is useable to request access for the UE to the CAG cell,
        detect whether the request signal includes an indicator indicating that the protected CAG ID is included in the request signal, and
        in case that the request signal includes the indicator, de-conceal the SUCI to a subscription permanent identifier (SUPI) and the protected CAG ID to determine a CAG ID, wherein the protected CAG ID includes the CAG ID embedded in the SUCI of the UE.

2. The core network apparatus in claim 1, wherein the processing circuitry is configured to provide the CAG ID for authentication.

3. The core network apparatus in claim 1, wherein the processing circuitry is configured, when the CAG ID is authenticated, to proceed with registration of the UE.

4. The core network apparatus in claim 1, wherein the protected CAG ID is the CAG ID concatenated with a mobile subscription identification number (MSIN) associated with the UE.

5. The core network apparatus in claim 1, wherein the protected CAG ID is the CAG ID concatenated with a part of the SUPI associated with the UE.

6. A user equipment (UE) for accessing one or more closed access group (CAG) cells, the UE comprising:
    radio communications circuitry; and
    processing circuitry coupled to the radio communications circuitry and configured to:
        produce a protected CAG identifier (ID) useable to request access for the UE to the CAG cell, and
        provide the radio communications circuitry with a subscription concealed identifier (SUCI), the protected CAG ID and an indicator,
    wherein the radio communications circuitry is configured to transmit to a radio access network a request signal directed to a core network,
    wherein the request signal includes the SUCI and the protected CAG ID,
    wherein the indicator indicates that the protected CAG ID is included in the request signal, and
    wherein the protected CAG ID includes a CAG ID embedded in the SUCI of the UE.

7. The UE in claim 6, wherein the request signal is a registration request and the protected CAG ID protects the CAG ID of the UE from linking of attacker for accessing to a Public Network integrated Non-Public Network (PN-iNPN) via the CAG cell.

8. The UE in claim 6, wherein the protected CAG ID is the CAG ID concatenated with a mobile subscription identification number (MSIN) associated with the UE.

9. The UE in claim 6, wherein the protected CAG ID is the CAG ID concatenated with a part of a subscription permanent identifier (SUPI) associated with the UE.

10. A non-transitory, computer-readable storage medium having computer-readable instructions stored thereon for accessing one or more closed access group (CAG) cells, the computer-readable instructions are configured to, when executed, instruct one or more processors to:
    produce a protected CAG identifier (ID) useable to request access for the UE to the CAG cell and provide a subscription concealed identifier (SUCI), the protected CAG ID, and an indicator to radio communications circuitry, and
    cause to be transmitted to a radio access network a request signal directed to a core network,
    wherein the request signal includes the SUCI and the protected CAG ID,
    wherein the indicator indicates that the protected CAG ID is included in the request signal, and
    wherein the protected CAG ID includes a CAG ID embedded in the SUCI of the UE.

11. A method implemented by a user equipment (UE) for accessing one or more closed access group (CAG) cells, the method comprising:
    producing by processing circuitry a protected CAG identifier (ID) useable to request access for the UE to the CAG cell and providing a subscription concealed identifier (SUCI), the protected CAG ID, and an indicator to radio communications circuitry, and transmitting by the radio communications circuitry to a radio access network a request signal directed to a core network, wherein the request signal includes the SUCI and the protected CAG ID, wherein the indicator indicates that the protected CAG ID is included in the request signal, and wherein the protected CAG ID includes a CAG ID embedded in the SUCI of the UE.

12. A method implemented by a core network apparatus for supporting a user equipment (UE) accessing one or more closed access group (CAG) cells via a radio access network, the method comprising:

receiving a request signal that includes a subscription concealed identifier (SUCI) and a protected CAG identifier (ID) associated with the UE, wherein the protected CAG ID is useable to request access for the UE to the CAG cell, detecting whether the request signal includes an indicator indicating that the protected CAG ID is included in the request signal, and in response to the request signal including the indicator, de-concealing the SUCI to a subscription permanent identifier (SUPI) and the protected CAG ID to determine a CAG ID, wherein the protected CAG ID includes the CAG ID embedded in the SUCI of the UE.

* * * * *